US008335978B2

(12) United States Patent
Nakano

(10) Patent No.: US 8,335,978 B2
(45) Date of Patent: Dec. 18, 2012

(54) LIQUID CONTAINER

(75) Inventor: Shuichi Nakano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 940 days.

(21) Appl. No.: 12/409,164

(22) Filed: Mar. 23, 2009

(65) Prior Publication Data

US 2009/0287891 A1 Nov. 19, 2009

(30) Foreign Application Priority Data

Mar. 26, 2008 (JP) ................................ 2008-079632
Mar. 26, 2008 (JP) ................................ 2008-079639
Mar. 12, 2009 (JP) ................................ 2009-059583

(51) Int. Cl.
*G06F 11/00* (2006.01)

(52) U.S. Cl. .................. 714/799; 347/1; 347/5; 347/85; 347/86; 347/214; 711/155; 710/300

(58) Field of Classification Search .................. 714/799
See application file for complete search history.

(56) References Cited

U.S. PATENT DOCUMENTS 6,912,686 B1 * 6/2005 Rodriguez et al. ............ 714/799
7,052,101 B2 5/2006 Matsumoto et al.
7,673,218 B2 * 3/2010 Lapstun et al. ............... 714/769
7,958,359 B2 * 6/2011 Sharma et al. ................ 713/176
8,128,186 B2 * 3/2012 Bauman .......................... 347/19
2002/0036668 A1 3/2002 Matsumoto et al.
2003/0063311 A1 4/2003 Covitt et al.
2003/0090531 A1 * 5/2003 Wong et al. ....................... 347/1
2005/0243118 A1 11/2005 Ward et al.
2006/0146101 A1 * 7/2006 Silverbrook .................... 347/85
2007/0014396 A1 * 1/2007 Miyauchi et al. ............... 380/28
2009/0150748 A1 * 6/2009 Egner et al. .................. 714/758

FOREIGN PATENT DOCUMENTS

EP 1201449 A2 5/2002
JP 64-082164 A 3/1989
JP 10-069139 A 3/1998
JP 2000-031980 A 1/2000
JP 2002-127550 A 5/2002
JP 2002-166530 A 6/2002
JP 2003-118143 A 4/2003

(Continued)

OTHER PUBLICATIONS

Krohn, M.N.; Freedman, M.J.; Mazieres, D.; , "On-the-fly verification of rateless erasure codes for efficient content distribution," Security and Privacy, 2004. Proceedings. 2004 IEEE Symposium on , vol., no., pp. 226-240, May 9-12, 2004.*

(Continued)

*Primary Examiner* — John Trimmings
(74) *Attorney, Agent, or Firm* — Stroock & Stroock & Lavan LLP

(57) ABSTRACT

In a semiconductor storage device 10 included in a liquid container 20, on reception of an encoding request for encoding readout data, a write-read controller 140 changes over the position of a switch 141 to output encoded readout data, which is obtained by an encoding operation in a data encoding circuit 150, to a data signal terminal SDAT. In the case of no reception of the encoding request for encoding the readout data, on the other hand, the write-read controller 140 changes over the position of the switch 141 to output raw data read out from a memory array 100 to the data signal terminal SDAT.

2 Claims, 17 Drawing Sheets

FOREIGN PATENT DOCUMENTS

| | | | |
|---|---|---|---|
| JP | 2005-251156 | A | 9/2005 |
| JP | 2005-324547 | A | 11/2005 |
| JP | 2006-050653 | A | 2/2006 |
| JP | 2006-159788 | A | 6/2006 |
| JP | 2007-093595 | A | 4/2007 |
| JP | 2007-326338 | A | 12/2007 |

OTHER PUBLICATIONS

International Search Report issued on Apr. 28, 2009 in International Application No. PCT/JP2009/056773.

* cited by examiner

AT THE TIME OF READING OUT ENCODED DATA
(AT THE TIME OF GENERATION OF VERIFICATION DATA)

AT THE TIME OF READING OUT ORDINARY DATA

AT THE TIME OF WRITING DATA

LIQUID CONTAINER

BACKGROUND OF THE INVENTION

The present invention relates to a liquid container equipped with a storage device, an access control method of controlling an access to the storage device mounted on the liquid container, as well as such a storage device and an access control method of controlling an access to such a storage device.

One typical example of the liquid container equipped with the storage device is an ink cartridge. The ink cartridge uses data stored in the storage device to determine whether the ink cartridge is an optimum replacement part for a printing apparatus. One known technique encodes the data stored in the storage device to allow the determination with high accuracy. There is also a technique of making a storage device attached to an optimum member for a host device. This technique encodes data stored in the storage device to enhance the accuracy of determination of whether the member as the attachment target of the storage device is optimum for the host device.

The ink cartridge designed to encode the data stored in the storage device is, however, not applicable to a conventional printer without data encoding capability. In order to deal with this problem, ink cartridges with data encoding capability may be provided separately from ink cartridges without data encoding capability. This, however, undesirably increases the number of different types of ink cartridges as replacement parts, so as to trigger the user's confusion and increase the management cost in the manufacturer.

In the application of encoding data stored in the storage device, a computer without data encoding capability or without installation of an encoding decoding program is not capable of utilizing the data stored in the storage device. In order to deal with this problem, storage devices with data encoding capability may be provided separately from storage devices without data encoding capability. This, however, undesirably increases the number of different types of storage devices, so as to trigger the user's confusion and increase the manufacturing cost and the sales management cost of the storage device

SUMMARY OF THE INVENTION

By taking into account the problems of the prior art techniques discussed above, there would thus be a demand for improving the adaptability of a liquid container and the adaptability of a storage device.

The present invention accomplishes at least part of the demand mentioned above and the other relevant demands by variety of configurations discussed below.

According to a first aspect, the invention is directed to a liquid container equipped with a storage device and designed to be attachable to a printing apparatus. The liquid container of the first aspect includes: a memory element configured to store data; an encoding requirement determination unit configured to, in response to a data readout request received from the printing apparatus to read out the data stored in the memory element, determine requirement or non-requirement for encoding readout data; and a memory element controller configured to, on the requirement for encoding the readout data, perform an encoding operation of data read out from the memory element and output encoded data.

In one preferable embodiment of the liquid container according to the first aspect of the invention, on the non-requirement for encoding the readout data, the memory element controller outputs the data read out from the memory element without performing the encoding operation.

In another preferable embodiment of the liquid container according to the first aspect of the invention, the memory element controller includes: a read-write execution unit configured to perform a data writing operation into the memory element and a data readout operation from the memory element; and an encoding processor configured to perform the encoding operation of the data read out from the memory element. In this embodiment, the read-write execution unit performs the data writing operation into and the data readout operation from the memory element, while the encoding processor performs the encoding operation of the readout data.

In one preferable application of the liquid container according to the first aspect of the invention, the encoding operation is an error detection encoding operation using all or part of the data stored in the memory element. This application allows an encoding operation with an error detection code.

In another preferable application of the liquid container according to the first aspect of the invention, the encoding operation is a hash encoding operation of all or part of the data stored in the memory element. This application allows a hash encoding operation.

In still another preferable application of the liquid container according to the first aspect of the invention, the encoding operation is a hash encoding operation of a computation result of all or part of the data stored in the memory element. This application allows a hash encoding operation of the computation result.

According to a second aspect, the invention is also directed to a liquid container equipped with a storage device and designed to be attachable to a printing apparatus. The liquid container of the second aspect includes: a memory element configured to store data; an encoder configured to perform an encoding operation of data read out from the memory element; and a selector configured to selectively output either the data read out from the memory element or encoded data obtained by encoding the readout data in the encoder.

According to a third aspect, the invention is further directed to a control method of controlling a storage device that is included in a liquid container attachable to a printing apparatus. In response to a data readout request received from the printing apparatus to read out data stored in a memory element, the control method of the third aspect determines requirement or non-requirement for encoding readout data. On the requirement for encoding the readout data, the control method performs an encoding operation of data read out from the memory element and outputs encoded data.

The control method of the third aspect ensures the similar advantages and effects to those of the liquid container of the first aspect. The control method of the third aspect may have any of the applications and the arrangements adopted for the liquid container of the first aspect as explained above. The control method of the third aspect may be actualized by a computer program or a computer program product recorded in a computer readable medium, such as a CD, a DVD, or an HDD.

According to a fourth aspect, the invention is also directed to a printing apparatus system including a printing apparatus and a liquid container that is equipped with a memory element configured to store data and is designed to be detachably attached to the printing apparatus. In the printing apparatus system of the fourth aspect, the printing apparatus has an output unit configured to output a data readout request to the printing material container. The liquid container has: an encoding requirement determination unit configured to, in response to a data readout request received from the printing apparatus to read out the data stored in the memory element, determine requirement or non-requirement for encoding readout data; and a memory element controller configured to, on the requirement for encoding the readout data, perform an encoding operation of data read out from the memory element and output encoded data.

In one preferable embodiment of the printing apparatus system according to the fourth aspect of the invention, when the printing apparatus has the requirement for encoding the readout data, the data readout request includes a command of instructing the encoding operation of the readout data.

The liquid container according to any of the first through the fourth aspects of the invention discussed above is applicable to both a printing apparatus that requires the encoding operation of readout data and a printing apparatus that does not require the encoding operation of readout data. There is accordingly no need of manufacturing exclusive liquid containers for the respective printing apparatuses. This arrangement effectively reduces the manufacturing cost or the sales management cost of liquid container products and enables the user to purchase and use the liquid container products without confusion.

According to a fifth aspect, the invention is further directed to a storage device that is connectable with a computing machine. The storage device of the fifth aspect has: a connection unit configured to be connected with the computing machine; a memory element configured to store data; an encoding requirement determination unit configured to, in response to a data readout request received from the computing machine to read out the data stored in the memory element, determine requirement or non-requirement for encoding readout data; and a memory element controller configured to, on the requirement for encoding the readout data, perform an encoding operation of data read out from the memory element and output encoded data to the communication unit.

In one preferable embodiment of the storage device according to the fifth aspect of the invention, on the non-requirement for encoding the readout data, the memory element controller outputs the data read out from the memory element without performing the encoding operation.

In another preferable embodiment of the storage device according to the fifth aspect of the invention, the memory element controller includes: a read-write execution unit configured to perform a data writing operation into the memory element and a data readout operation from the memory element; and an encoding processor configured to perform the encoding operation of the data read out from the memory element. In this embodiment, the read-write execution unit performs the data writing operation into and the data readout operation from the memory element, while the encoding processor performs the encoding operation of the readout data.

In one preferable application of the storage device according to the fifth aspect of the invention, the encoding operation is an error detection encoding operation using all or part of the data stored in the memory element. This application allows an encoding operation with an error detection code.

In another preferable application of the storage device according to the fifth aspect of the invention, the encoding operation is a hash encoding operation of all or part of the data stored in the memory element. This application allows a hash encoding operation.

In still another preferable application of the storage device according to the fifth aspect of the invention, the encoding operation is a hash encoding operation of a computation result of all or part of the data stored in the memory element. This application allows a hash encoding operation of the computation result.

According to a sixth aspect, the invention is also directed to a storage device that is connectable with a control device. The storage device of the sixth aspect includes: a communication unit configured to make communication of data with the control device; a memory element configured to store data; an encoder configured to perform an encoding operation of data read out from the memory element; and a selector configured to selectively output either the data read out from the memory element or encoded data obtained by encoding the readout data in the encoder.

According to a seventh aspect, the invention is further directed to a control method of controlling a storage device that is connectable with a control device and includes a memory element configured to store data. In response to a data readout request received from the control device to read out the data stored in the memory element, the control method of the third aspect determines requirement or non-requirement for encoding readout data. On the requirement for encoding the readout data, the control method performs an encoding operation of data read out from the memory element and outputs encoded data.

The control method of the seventh aspect ensures the similar advantages and effects to those of the storage device of the fifth aspect. The control method of the seventh aspect may have any of the applications and the arrangements adopted for the storage device of the fifth aspect as explained above. The control method of the seventh aspect may be actualized by a computer program or a computer program product recorded in a computer readable medium, such as a CD, a DVD, or an HDD.

According to an eighth aspect, the invention is also directed to a storage device control system including a control device and a storage device that is connectable with the control device and includes a memory element configured to store data. In the storage device control system of the eighth aspect, the control device includes an output unit configured to output a data readout request to the storage device. The storage device has: an encoding requirement determination unit configured to, in response to a data readout request received from the computing machine to read out the data stored in the memory element, determine requirement or non-requirement for encoding readout data; and a memory element controller configured to, on the requirement for encoding the readout data, perform an encoding operation of data read out from the memory element and output encoded data.

In one preferable embodiment of the storage device control system according to the eighth aspect of the invention, when the control device has the requirement for encoding the readout data, the data readout request includes a command of instructing the encoding operation of the readout data.

The storage device according to any of the fifth through the eighth aspects of the invention discussed above is applicable to both a control device that requires the encoding operation of readout data and a control device that does not require the encoding operation of readout data. There is accordingly no need of manufacturing exclusive storage devices for the respective control devices. This arrangement effectively reduces the manufacturing cost or the sales management cost of storage device products and enables the user to purchase and use the storage device products without confusion.

According to a ninth aspect, the invention is directed to a printing apparatus used with a liquid container including a semiconductor device configured to store data. The printing apparatus includes: an ordinary data readout unit configured to read out non-encoded ordinary data from the semiconductor device; an encoded data readout unit configured to give a requirement for an encoding operation of the ordinary data to the semiconductor device and read out encoded data obtained by the encoding operation of the ordinary data; an encoding decoding module configured to make the ordinary data subjected to encoding, which is equivalent to the encoding operation, and thereby generate a comparative encoded data; and a verification unit configured to compare the comparative encoded data with the encoded data and verify a communication status between the semiconductor device and the printing apparatus.

The printing apparatus according to the ninth aspect of the invention compares the comparative encoded data with the encoded data to verify communication between the semiconductor device and the printing apparatus. The printing apparatus obtains both the non-encoded, ordinary data and the encoded data from the semiconductor device to detect the occurrence of any abnormality in the communication path between the semiconductor device and the printing apparatus. The technique of the ninth aspect of the invention is actualized by a communication verification method adopted in such a printing apparatus, a computer program executed to allow the communication verification method, and a computer readable medium in which such a computer program is recorded.

In one preferable embodiment of the ninth aspect of the invention, the printing apparatus further has a data writing unit configured to write the ordinary data into the semiconductor device. The ordinary data readout unit reads out the ordinary data written by the data writing unit, and the encoded data readout unit reads out the encoded data obtained by the encoding operation of the ordinary data written by the data writing unit. In this embodiment, the data written at a preset timing may be used as the ordinary data. It is thus not required to write specific data for the purpose of verification of communication. This arrangement desirably reduces the frequency of accesses to the semiconductor device.

In one preferable application of the printing apparatus according to the ninth aspect of the invention, the encoded data is subjected to a reversible second encoding operation subsequent to an irreversible first encoding operation. The encoding decoding module decodes the second encoding operation of the encoded data to obtain encoded data of only the first encoding operation, while performing the first encoding operation of the ordinary data. The printing apparatus of this application performs the verification based on the irreversible first encoding operation. This arrangement desirably enhances the accuracy of the verification.

According to a tenth aspect, the invention is further directed to a circuit board. The circuit board of the tenth aspect includes: a communication unit configured to make communication of data with an external control device; a semiconductor device having: a memory element configured to store data; an encoding requirement determination unit configured to, in response to a data readout request received from the external control device to read out the data stored in the memory element, determine requirement or non-requirement for encoding readout data; and a memory element controller configured to, on the requirement for encoding the readout data, perform an encoding operation of data read out from the memory element and output encoded data; and at least one external terminal electrically connecting with the communication unit.

The circuit board according to the tenth aspect of the invention discussed above is applicable to both an external control device that requires the encoding operation of readout data and an external control device that does not require the encoding operation of readout data. There is accordingly no need of manufacturing exclusive semiconductor devices for the respective external control devices. This arrangement effectively reduces the manufacturing cost or the sales management cost of circuit boards including semiconductor devices and enables the user to purchase and use the circuit boards without confusion. Any of the applications and arrangements of the storage device according to the fifth through the seventh aspects of the invention discussed above may similarly be adopted for the semiconductor device of the circuit board according to the tenth aspect of the invention.

DETAILED DESCRIPTION OF THE PREFERRED EMBODIMENTS

First Embodiment

A liquid container and an access control method of controlling an access to a semiconductor storage device mounted on the liquid container are described below as a first embodiment of the invention with reference to the accompanied drawings.

Structure of Semiconductor Storage Device

Figure 1:
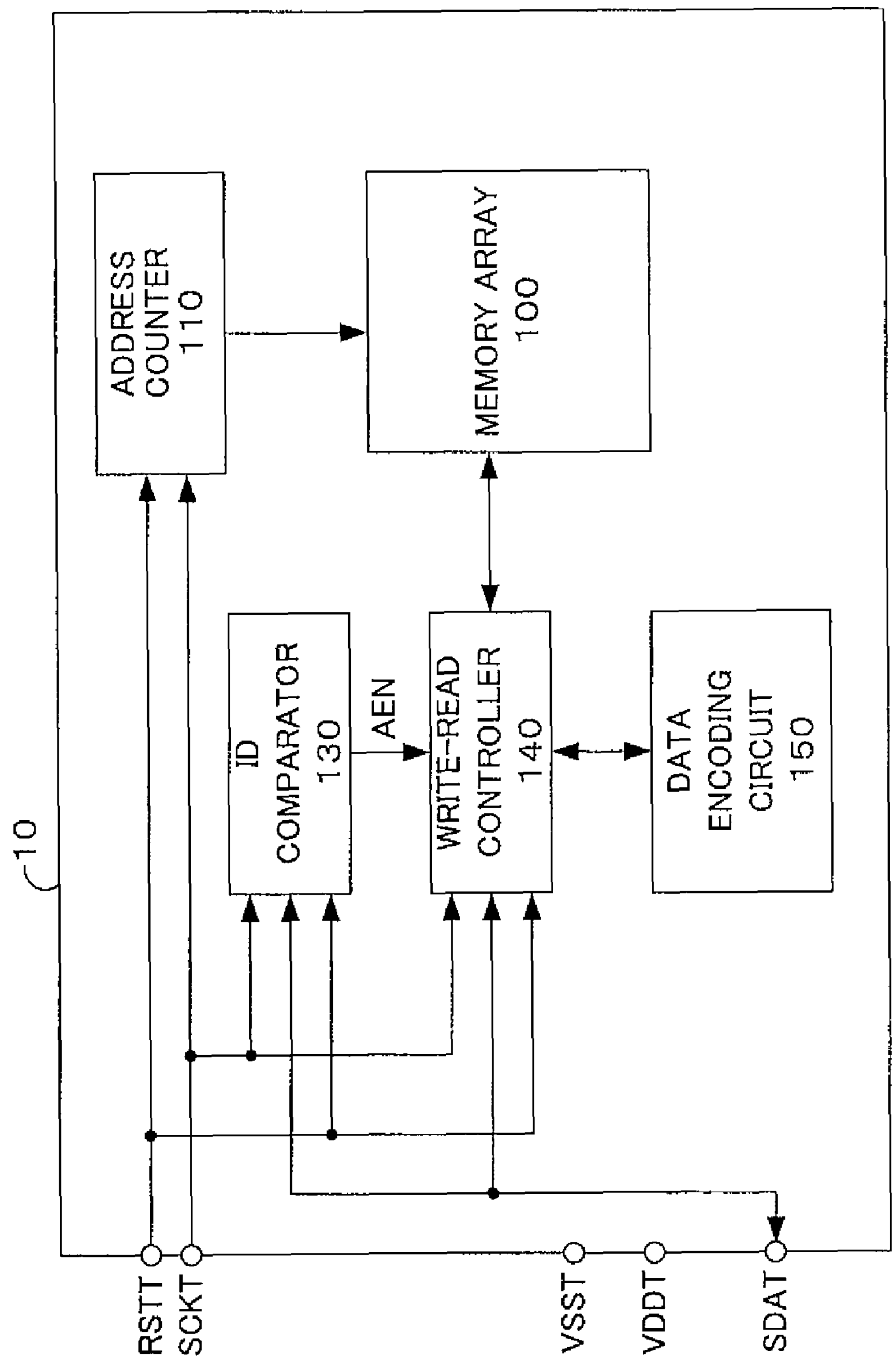
FIG. 1 is a block diagram showing the functional internal structure of a semiconductor storage device included in a liquid container in a first embodiment of the invention.
Figure 2:
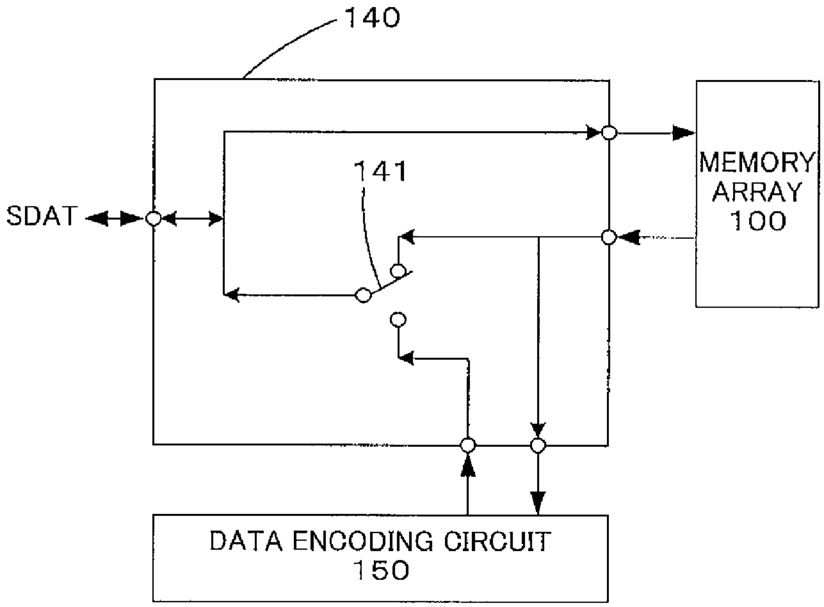
FIG. 2 is a block diagram showing the functional internal structure of a write-read controller in the first embodiment.
Figure 3:
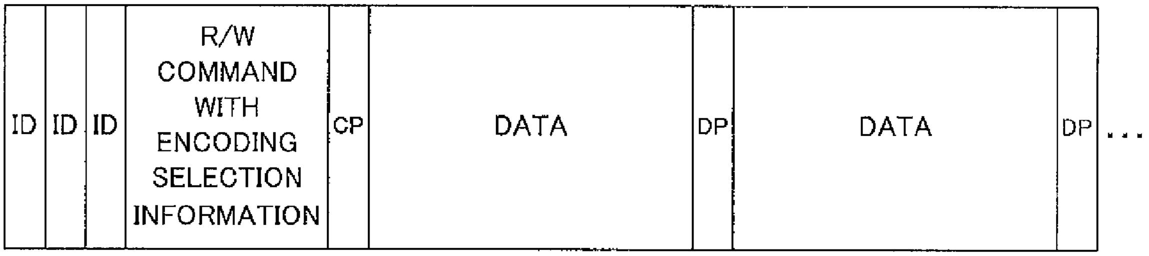
FIG. 3 is an explanatory view schematically showing one example of a data readout-demanding data array input into the semiconductor storage device included in the liquid container of the first embodiment.

The structure of a liquid container of this embodiment and the structure of a semiconductor storage device included in the liquid container are discussed below with reference to FIGS. 1 through 3. FIG. 1 is a block diagram showing the functional internal structure of the semiconductor storage device included in the liquid container of this embodiment. FIG. 2 is a block diagram showing the functional internal structure of a write-read controller in the embodiment. FIG. 3 is an explanatory view schematically showing one example of a data readout-demanding data array input into the semiconductor storage device included in the liquid container of the embodiment.

A semiconductor storage device 10 of the embodiment is constructed as a sequential access-type storage device that does not require external input of address data for specifying an address of access destination. The semiconductor storage device 10 includes a memory array 100 as a memory element, an address counter 110, an ID comparator 130, a write-read controller 140, and a data encoding circuit 150. The respective circuits are interconnected by bidirectional bus signal lines. The combination of the write-read controller 140 with at least the ID comparator 130 and the data encoding circuit 150 is equivalent to the memory element controller of the invention.

The memory array 100 represents a storage area having the EEPROM characteristics of enabling data to be electrically written and erased. The memory array 100 includes a number of data cells (memory cells), each having the capacity for storing 1-bit information. A specific address unit of the memory array 100 is, for example, eight addresses (addresses of 8-bit data capacity) per row. In the structure having sixteen data cells (sixteen words) per column, the memory array 100 is capable of totally storing data of 16 words×8 bits (=128 bits).

The memory array 100 of this embodiment apparently has multiple rows of the 8-bit capacity. Each of the multiple rows is, however, not an independent data cell row, but rather one long data cell row is folded in the unit of 8 bits. Only as a matter of convenience, a row starting from a $9^{th}$ bit is called a $2^{nd}$ byte or row, and a row starting from a $17^{th}$ bit is called a 3rd byte or row. A sequential access from the head bit is thus required to make access to a desired address in the memory array 100. The sequential access system accordingly does not allow a direct access to a desired address, which is allowed in the random access system.

In the memory array 100, word lines and bit (data) lines are connected to the respective data cells. The data writing procedure selects a word line (row) corresponding to a certain data cell (by application of a selected voltage) and applying a write voltage to a corresponding bit line to write data into the certain data cell. The data reading procedure selects a word line (row) corresponding to a certain data cell, connects a corresponding bit line with the write-read controller 140, and identifies detection or no detection of electric current to read data (1 or 0) from the certain data cell. The specific address unit of this embodiment represents the number of addresses (the number of data cells), which enable data to be written in by application of a write voltage onto one word line.

The memory array 100 has a column selection circuit (not shown) that sequentially connects the columns (bit lines) with the write-read controller 140, in response to an external clock pulse number counted by the address counter 110. The memory array 100 also has a row selection circuit (not shown) that sequentially applies a selected voltage to the rows (word lines), in response to the external clock pulse number counted by the address counter 110. As discussed above, the semiconductor storage device 10 of the embodiment does not make access to the memory array 100 based on the address data but rather makes access to a desired address according to the clock pulse number counted by the address counter 110.

The address counter 110 is connected with a reset signal terminal RSTT, a clock signal terminal SCKT, the write-read controller 140, and the memory array 100. The address counter 110 is reset to an initial value by setting 0 (or a low level) to a reset signal input via the reset signal terminal RSTT. The address counter 110 counts the clock pulse number (increments the count) synchronously with a fall of each clock pulse input via the clock signal terminal SCKT after setting 1 to the reset signal.

The address counter 110 of this embodiment is an 8-bit address counter that stores eight clock pulse numbers corresponding to the number of data cells (the number of bits) per row in the memory array 100. The initial value of the address counter 110 may be any value related to a head position of the memory array 100 and is typically equal to 0.

The ID comparator 130 is connected with the clock signal terminal SCKT, a data signal terminal SDAT, and the reset signal terminal RSTT. The ID comparator 130 compares identification data included in a data array input via the data signal terminal SDAT with identification data stored in the memory array 100 to perform ID matching. According to a concrete procedure of ID matching, the ID comparator 130 obtains data of first 3 bits or identification data, which is included in an operation code input after a reset signal RST, from the write-read controller 140. The ID comparator 130 has a 3-bit register (not shown) for storing identification data of first 3 bits included in an input data array shown in FIG. 3, as well as a 3-bit register (not shown) for storing identification data of upper-most 3 bits obtained from a specified address in the memory array 100 via the write-read controller 140. The ID comparator 130 compares the values in these two registers with each other, so as to determine matching or mismatching of the two identification data. When the two identification data are identical with each other, the ID comparator 130 sends an access enable signal AEN to the write-read controller 140. The ID comparator 130 clears the values of the two registers, in response to input of the reset signal RST (RST=0 or low).

The write-read controller 140 is connected with the ID comparator 130, the data encoding circuit 150, the clock signal terminal SCKT, the data signal terminal SDAT, and the reset signal terminal RSTT. The write-read controller 140 is constructed as a circuit that waits for entry of the access enable signal AEN from the ID comparator 130, checks write/read control information (W/R command with encoding selection information in a $4^{th}$ bit through an $8^{th}$ bit following 3-bit ID information) included in a data array input via the data signal terminal SDAT synchronously with a $4^{th}$ clock signal after input of the reset signal RST (see FIG. 3), and changes over the internal operation of the semiconductor storage device 10 to one path selected among a write path and at least two read paths. As shown in FIG. 3, the data array input into the semiconductor storage device 10 of the embodiment includes the identification (ID) information in the first 3 bits, the W/R command with encoding selection information in the $4^{th}$ bit through the $8^{th}$ bit, and a command parity bit CP in a $9^{th}$ bit. The input data array as write data includes 8-bit write packet data (in a $10^{th}$ bit to a $17^{th}$ bit in the example of FIG. 3) and a data parity bit DP (in an $18^{th}$ bit in the example of FIG. 3). The data array may have multiple write packet data and multiple data parity bits DP added immediately after the respective write packet data.

In response to input of the access enable signal AEN from the ID comparator 130, the write-read controller 140 analyzes the obtained write/read control information and performs changeover control of a data transfer direction of the memory array 100 and a data transfer direction of the data signal terminal SDAT (more precisely, a data transfer direction of a signal line connecting with the data signal terminal SDAT) based on the result of the analysis. The write-read controller 140 has an 8-bit register (not shown) for temporarily storing 8-bit write data after an operation code included in write data that is input from the data signal terminal SDAT via a connecting input signal line, as well as a register (not shown) for storing data read from the memory array 100.

A data array (MSB) input via the input signal line from the data signal terminal SDAT is sequentially stored in the 8-bit register until all 8 bits are occupied. When all 8-bits are occupied, the stored 8-bit data is written into the memory array 100.

At a power-ON time or a reset time of the semiconductor storage device 10, the write-read controller 140 sets the data transfer direction of the memory array 100 to a reading direction and makes the signal line connecting with the data signal terminal SDAT high impedance to prohibit data transfer via the data signal terminal SDAT. This state is kept until identification of a write demand based on the result of analysis of the obtained read/write control information. Data of first 8 bits in a data array input via the data signal terminal SDAT after the reset signal are not written into the memory array 100, while data (ID information) stored in first 3 bits in the memory array 100 are transferred to the ID comparator 130. The first 8 bits in the memory array 100 are thus kept in a read only state.

On the occasion of the writing operation, the write-read controller 140 changes over the data transfer direction of a bus signal line to a writing direction, in response to input of a specific number of clock pulses corresponding to an initial address in a writable area. In response to input of a specified number of clock pulses corresponding to an end address in the writable area, the write-read controller 140 changes over the data transfer direction of the bus signal line to a reading direction. A write voltage required for the writing operation is generated, for example, by a charge pump circuit (not shown).

On the occasion of the reading operation, the write-read controller 140 changes over the data transfer direction of the bus signal line to the reading direction, in response to input of the specific number of clock pulses corresponding to the initial address in the writable area.

The write-read controller 140 has a switch 141 functioning as a selector of selecting either raw readout data read from the memory array 100 or encoded readout data read from the memory array 100 and encoded by the data encoding circuit 150 as shown in FIG. 2. The write-read controller 140 analyzes the W/R command with encoding selection information sent from a printing apparatus functioning as a host computer. When the analyzed W/R command includes a request for encoding the readout data, the write-read controller 140 changes over the position of the switch 141 to output the encoded readout data. When the analyzed W/R command does not include such a request for encoding the readout data, on the other hand, the write-read controller 140 changes over the position of the switch 141 to output the raw readout data. The printing apparatus without the capability of processing the encoded readout data uses the non-encoded, raw readout data to perform a desired printing operation without a request for data encoding. The printing apparatus with the capability of processing the encoded readout data, on the other hand, uses the encoded readout data to perform a desired printing operation with a request for data encoding.

The data encoding circuit 150 is connected with the write-read controller 140 via a signal line. The data encoding circuit 150 uses the readout data input from the write-read controller 140 to perform an encoding process. The encoding process by the data encoding circuit 150 may, for example, perform a parity operation, a checksum operation, or a CRC (cyclic redundancy checksum) operation of all or part of the readout data. The data subjected to the encoding operation may be all readable data stored in the memory array 100 or may be target readout data as an object of a current data readout request. In this application, the data encoding circuit 150 generates a readout data array by addition of a parity value (parity bit) or a checksum value given as the result of the encoding operation. The readout data stored in the semiconductor storage device 10 included in the liquid container 20 may be structured to include at least data relating to the liquid usage (a consumed amount or a remaining amount of the liquid). The value of this liquid usage-relating data naturally varies, so that the readout data stored in the memory array 100 are updated at appropriate timings. The liquid usage-relating data may be used for the encoding operation, in response to a readout request for another data, as well as in response to a readout request for the liquid usage-relating data. The encoding operation can accordingly give the combination of the varying readout data with the parity bit or the checksum value. This arrangement desirably enhances the uniqueness and the reliability of the readout data array.

The encoding process by the data encoding circuit 150 may encode the parity bit or the checksum value given as the result of the parity operation or the checksum operation of all or part of the readout data. In this application, the data encoding circuit 150 generates a readout data array by addition of the encoded parity bit or the encoded checksum value. Coding the parity bit or the checksum value given as the error correcting code enhances the detection accuracy of data corruption or data alteration in the course of communication, thus improving the reliability of the readout data array. In this application, the encoding process may be performed with the checksum value or the parity bit obtained from the varying readout data. This arrangement further improves the reliability of the readout data array. The subject of the encoding process may be the combination of the readout data and the parity bit or may be the result of verification of the readout data (expressed by a 1-bit value representing a verified status or a non-verified status).

The encoding process by the data encoding circuit 150 may calculate a hash value (hash coding) from the result of the encoding operation of all or part of the readout data according to a hash function. In this application, the data encoding circuit 150 generates a readout data array by addition of a hash value calculated from the parity bit, the checksum value, or the verification result of the readout data. Hash coding the parity bit, the checksum value, or the verification result of the readout data given as the error correction code enhances the detection accuracy of data corruption or data alteration in the course of communication, thus improving the reliability of the readout data array. In this application, hash coding of calculating a hash value may be performed with the checksum value, the parity bit, or the verification result obtained from the varying readout data. This arrangement further improves the reliability of the readout data array. The hash value may be calculated from the combination of the readout data and the parity bit.

The subject of the encoding process is not restricted to the target data as the object of a data readout request but may be another data stored in the memory array 100. For example, the liquid usage-relating data (the consumed amount or the remaining amount of the liquid) may be subjected to the encoding process, even in the case of a readout request for data of each liquid type, such as ink data. The encoding process using the varying liquid usage-relating data gives a different result at each readout timing, thus improving the reliability of the readout data. In the semiconductor storage device 10 having the high encoding capability, the subject of hash coding is not restricted to the error correcting code obtained as the result of the encoding operation but may be the combination of the readout data with the error correcting code. The readout data itself may be subjected to hash coding without computation of the error correcting code.

One example of the circuit structure of the invention is shown in FIG. 2. A sending path from the memory array 100 is branched off into two pathways. One branch pathway of the sending path directly reaches the switch 141. The other branch pathway of the sending path reaches the switch 141 via the data encoding circuit 150. The data encoding circuit 150 is located between the memory array 100 and the switch 141 in the middle of the other branch pathway of the sending path. The output from the data encoding circuit 150 and the output from the memory array 100 are input into the switch 141. The switch 141 selects one of these inputs and outputs the selected input to the data terminal SDA.

System Configuration Including Liquid Container

Figure 4:
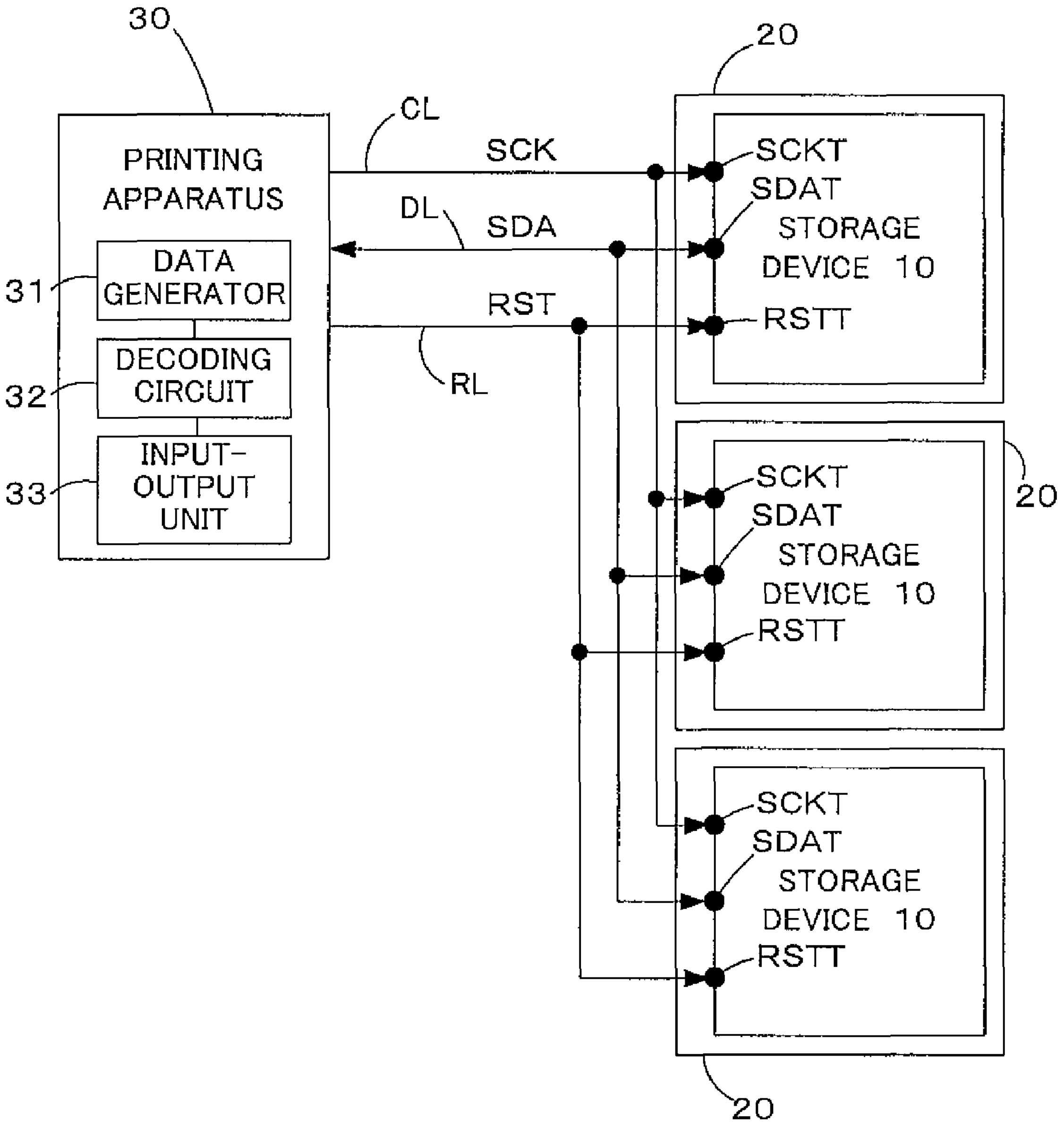
FIG. 4 is an explanatory view schematically illustrating the configuration of a system including liquid containers of the first embodiment and a printing apparatus.

FIG. 4 is an explanatory view schematically illustrating the configuration of a system including liquid containers of the embodiment and a printing apparatus.

A printing apparatus 30 is connected with semiconductor storage devices 10 of respective liquid containers 20 by the bus method via a clock signal line CL, a data signal line DL, and a reset signal line RL. Namely the respective semiconductor storage devices 10 are connected to the printing apparatus 30 via the common signal lines CL, DL, and RL. The printing apparatus 30 includes a data generator 31, a decoding circuit 32, and an input-output unit 33 mutually connected by internal wiring. The data generator 31 generates a data array including identification information (ID) for identifying each semiconductor storage device 10 as a readout target, a readout command, and an encoding request command.

Figure 6:
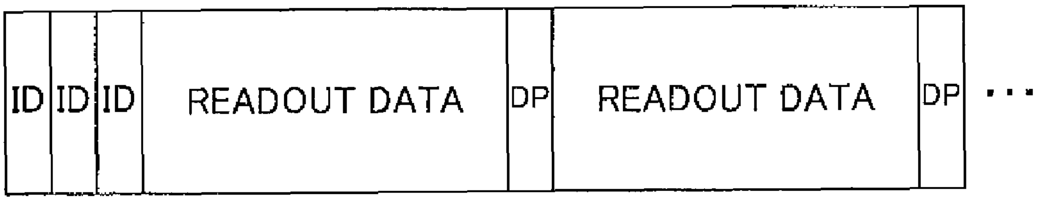
FIG. 6 is an explanatory view schematically showing one example of a readout data array output from the semiconductor storage device included in the liquid container of the first embodiment.

The decoding circuit 32 is constructed to decode the encoded readout data received from each semiconductor storage device 10 and verify the correctness of the readout data (determine whether the readout data is not corrupted due to, for example, falsification or noise). In the application with addition of parity bits, readout data is verified as correct data when a 1-bit data parity bit DP added to every 8-bit readout data as shown in FIG. 6 (discussed later) is identical with a parity bit calculated from the readout data. Otherwise the readout data is verified as incorrect data. In the application with addition of an encoded checksum value, verification of readout data is performed based on the readout data and a checksum value obtained by decoding the encoded checksum value with a key. In the application with addition of a hash value based on the verification result, readout data is verified as correct data when a hash value calculated from the result of a verification process of the readout data according to the hash function is identical with the hash value added to the readout data. Otherwise the readout data is verified as incorrect data. The verification may be performed by the decoding circuit 32 or may be performed by an exclusive verification circuit provided separately.

The input-output unit 33 is connected with the clock signal line CL, the data signal line DL, and the reset signal line RL to send a clock signal SCK and a reset signal RST to each semiconductor storage device 10 and to transmit a data signal SDA to and from each semiconductor storage device 10.

Operations of Semiconductor Storage Device

Figure 5:
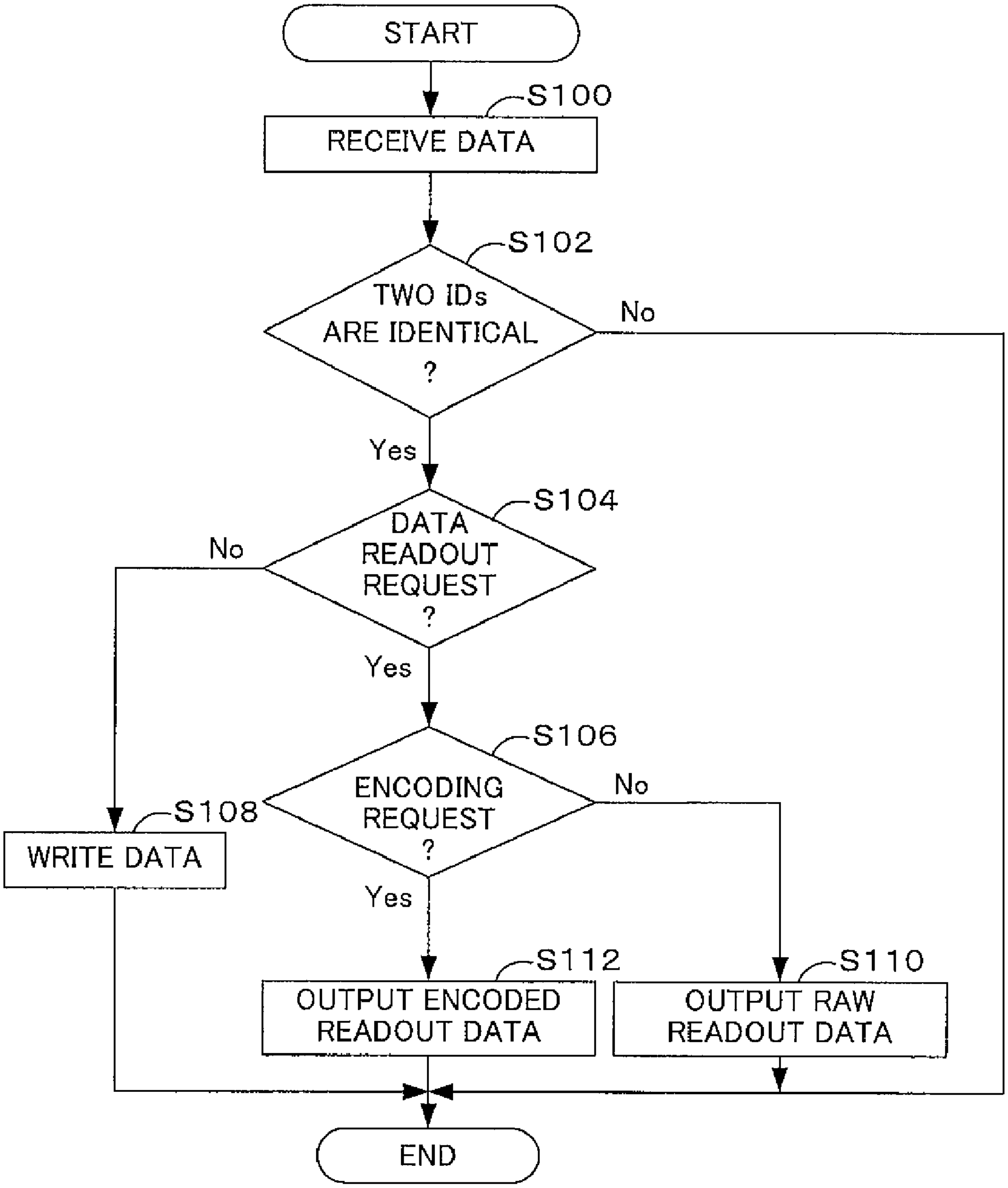
FIG. 5 is a flowchart showing a processing routine executed by each semiconductor storage device on the occasion of access control to the semiconductor storage device included in each liquid container of the first embodiment.

The operations of the semiconductor storage device 10 included in the liquid container of the embodiment are discussed with reference to FIGS. 5 and 6. FIG. 5 is a flowchart showing a processing routine executed by each semiconductor storage device on the occasion of access control to the semiconductor storage device included in the liquid container of the embodiment. FIG. 6 is an explanatory view schematically showing one example of a readout data array output from the semiconductor storage device included in the liquid container of the embodiment. The description hereafter is on the assumption that multiple semiconductor storage devices 10 are connected with the printing apparatus 30 by the bus method.

Each semiconductor storage device 10 receives data from the printing apparatus 30 (step S100) and compares an ID included in the received data (data array) with the own ID assigned to the semiconductor storage device 10 itself to perform ID matching (step S102). In the system of this embodiment, the respective liquid containers 20 (the respective semiconductor storage devices 10) are connected to the printing apparatus 30 by the bus method via the common clock signal line CL, the common data signal line DL, and the common reset signal line RL. Data is accordingly sent from the printing apparatus 30 to all the semiconductor storage devices 10. According to a concrete procedure of ID matching, the ID comparator 130 determines whether identification information included in the received data array is identical with identification information stored in the memory array 100 as explained previously.

In the case of mismatching of the two IDs (step S102: no), the semiconductor storage device 10 determines that the received data is not a data array to be addressed to the semiconductor storage device 10 itself and immediately terminates the processing routine for the current access.

In the case of matching of the two IDs (step S102: yes), on the other hand, the semiconductor storage device 10 determines whether there is a readout request for the received data (step S104). According to a concrete procedure, the ID comparator 130 sends the access enable signal AEN to the write-read controller 140 as explained previously. The write-read controller 140 receives the access enable signal AEN, analyzes a read/write command bit included in the received data array, and identifies whether the analyzed read/write command bit represents a data write request or a data readout request.

Upon determination that there is no data readout request for the received data but there is a data write request for the receive data (step S104: no), the semiconductor storage device 10 writes the received data into the memory array 100 (step S108) and terminates the processing routine. According to a concrete procedure of data writing, the write-read controller 140 writes the data at a desired address in the memory array 100 as explained previously.

Upon determination that there is a data readout request for the received data (step S104: yes), on the other hand, the semiconductor storage device 10 determines whether there is an encoding request of the readout data (step S106). According to a concrete procedure, the write-read controller 140 analyzes the W/R command with encoding selection information written in the $4^{th}$ bit through the $8^{th}$ bit of the received data array to identify the presence or the absence of an encoding request as explained previously.

Upon determination that there is no encoding request of the readout data (step S106: no), the semiconductor storage device 10 outputs the raw readout data read from the memory array 100 to the data signal terminal SDAT (step S110) and terminates the processing routine. According to a concrete procedure, the write-read controller 140 changes over the position of the switch 141 to output the raw readout data read from the memory array 100 to the data signal terminal SDAT as explained previously.

Upon determination that there is an encoding request of the readout data (step S106: yes), on the other hand, the semiconductor storage device 10 outputs the encoded readout data to the data signal terminal SDAT (step S112) and terminates the processing routine. According to a concrete procedure, the write-read controller 140 changes over the position of the switch 141 to output the encoded readout data read from the memory array 100 and encoded by the data encoding circuit 150 to the data signal terminal SDAT. In the application of the encoding operation with parity bits, the readout data sent to the printing apparatus 30 includes a data parity bit DP written immediately after every 8-bit readout data following 3-bit identification information as shown in FIG. 6. In the application of the encoding operation of a checksum value, the readout data sent to the printing apparatus 30 includes an encoded checksum value, in place of the data parity bit DP shown in the example of FIG. 6.

As discussed above, the liquid container 20 of the embodiment outputs the encoded readout data in response to an encoding request of the readout data, while outputting the raw readout data read from the memory array 100 in response to no encoding request of the readout data. Namely the readout data can be output in two different formats on the basis of whether the printing apparatus 30 is capable of processing the encoded readout data. This arrangement desirably improves the adaptability of the liquid container.

The same liquid container 20 is usable for both the printing apparatus 30 with the encoded data processability and the printing apparatus 30 without the encoded data processability. The encoding operation of the readout data is performed for the printing apparatus 30 with the encoded data processability to enhance the reliability of data communication between the liquid container 20 and the printing apparatus 30. The raw readout data read from the liquid container 20 is sent to the printing apparatus 30 without the encoded data processability. Namely the liquid container 20 of this structure ensures the reliability of data communication according to the function of the printing apparatus 30 as the attachment target of the liquid container 20. This arrangement effectively controls an increase in number of different types of liquid containers 20, thus restricting or preventing the user's confusion and an increase in manufacturing cost or management cost of the liquid container 20.

Upon detection of an error in readout data as a result of a decoding operation, the printing apparatus 30 with the liquid container 20 of the embodiment attached thereto does not perform series of operations using the readout data, for example, a printing operation or a liquid suction operation accompanied with the printing operation. This arrangement desirably prevents potential troubles caused by erroneous data. One example of the potential trouble caused by the erroneous trouble starts a print job irrespective of the less remaining amount of the liquid in the liquid container 20 than a required amount of the liquid for completion of the print job and forces to interrupt the print job. Another example of the potential trouble caused by the erroneous trouble starts a printing operation irrespective of the little remaining amount of the liquid in the liquid container 20 and causes blank hitting to damage a print head.

Structure of Liquid Container

Figure 7:
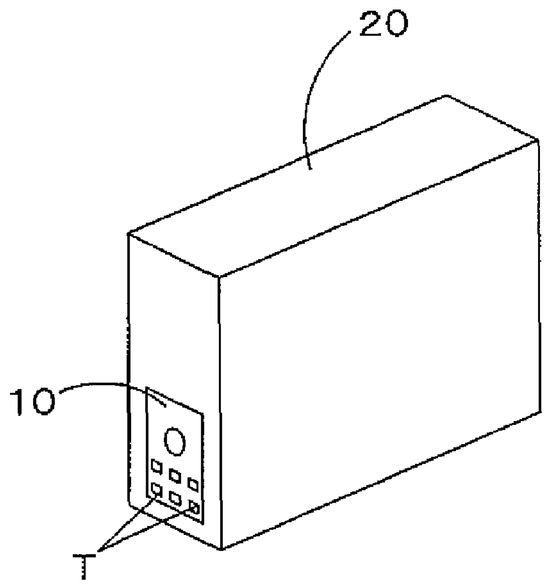
FIG. 7 is an explanatory view illustrating one example of the liquid container.

FIG. 7 is an explanatory view illustrating one example of the liquid container. The liquid container 20 includes the semiconductor storage device 10 discussed above and a liquid reservoir (not shown). The liquid container 20 may be a container for a print recording material, such as an ink cartridge. The semiconductor storage device 10 receives control signals from the printing apparatus 30 via terminals T and sends readout data and an error detection signal to the printing apparatus 30. The printing apparatus 30 may be equipped with only one liquid container 20 or with multiple liquid containers 20.

Figure 8:
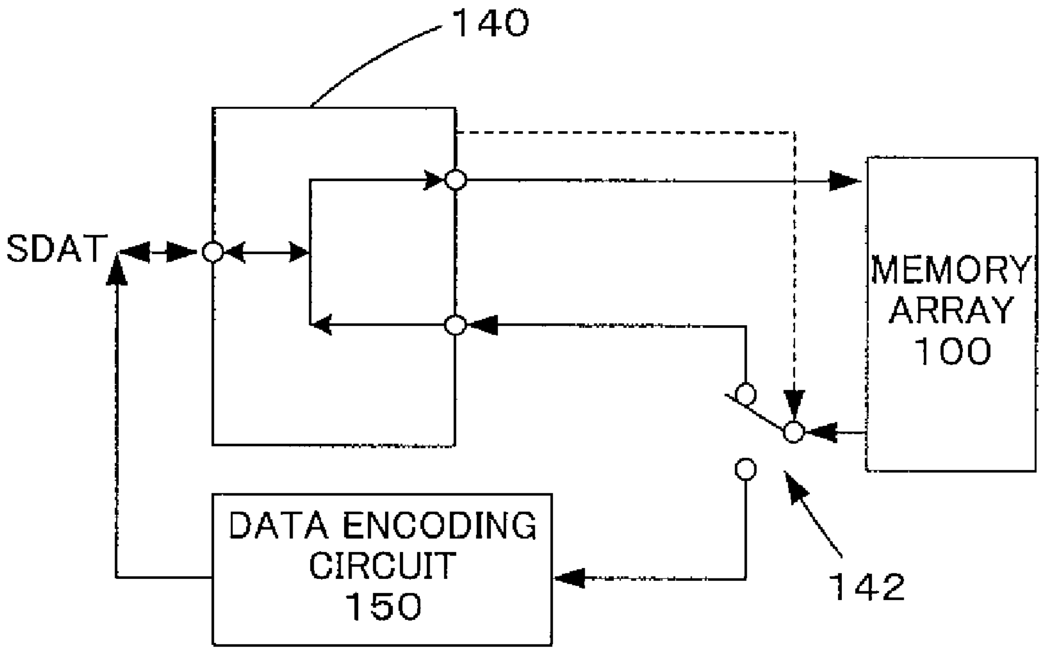
FIG. 8 is a block diagram showing another configuration of the write-read controller and a data encoding circuit in one modified example of the first embodiment.

Other Aspects of First Embodiments (1) In the structure of the embodiment discussed above, the write-read controller 140 changes over the position of the switch 141 to output either the encoded readout data or the raw readout data (non-encoded readout data) to the data signal terminal SDAT. In one modified structure shown in FIG. 8, the write-read controller 140 may change over the position of a switch 142 structured to output readout data read from the memory array 100 directly or via the data encoding circuit 150 to the data signal terminal SDAT. FIG. 8 is a block diagram showing another configuration of the write-read controller and the data encoding circuit in one modified example. The write-read controller 140 reads out data from the memory array 100 and determines whether the readout data is to be output to the data encoding circuit 150. In this modified structure, the switch 142 is provided in the middle of the pathway between the memory array 100 and the data encoding circuit 150. A signal line from the memory array 100 is electrically connected with the switch 142, while a signal line from the switch 142 is electrically connected both with the data encoding circuit 150 and with the data terminal SDAT. The switch 142 functions as a selector to select an output destination of the readout data read from the memory array 100 between the data terminal SDAT and the data encoding circuit 150.

(2) The above embodiment describes the semiconductor storage device 10 including the sequential access-type memory array 100. The structure of the embodiment gives the similar effects to a semiconductor storage device including a random access-type memory array. An address signal line may be provided separately from a data signal line for the random access-type memory array. The unit of data writing may be one bit, in place of one byte. In this modified application, several bits including one desired bit may be subjected to the encoding operation.

(3) In the structure of the embodiment discussed above, the multiple semiconductor storage devices 10 are bus-connected with the printing apparatus 30 via the signal lines. In one modified application, multiple semiconductor storage devices 10 may be star-connected with a printing apparatus 30. In another modified application, only one semiconductor storage device 10 may be connected with one printing apparatus 30. In the latter case, there is no necessity of identification information of the semiconductor storage device 10, so that the ID comparator 130 can be omitted from the semiconductor storage device 10.

(4) In the structure of the embodiment discussed above, the data encoding circuit 150 is provided separately from the write-read controller 140. In one modified structure, the data encoding circuit 150 may be incorporated in the write-read controller 140.

(5) The semiconductor storage device 10 may add encoding identification data to the readout data (data array). The encoding identification data shows whether the readout data has been subjected to the encoding operation performed by the data encoding circuit 150. In this modified application, the encoding identification data is used to readily determine whether the readout data is encoded.

(6) In the structure of the embodiment discussed above, there is an electrical contact of the terminals for data communication between the printing apparatus and the liquid container. In one modification, a contactless communication technique, such as RFID may be adopted for the data communication between the printing apparatus and the liquid container. In this modified application, a wireless communication antenna, such as an IC tag may be adopted for communication.

Second Embodiment

A semiconductor storage device and an access control method of controlling an access to the semiconductor storage device are described below as a second embodiment of the invention with reference to the accompanied drawings. The semiconductor storage device of the embodiment is equivalent to a storage device in the claims of the invention.

Structure of Semiconductor Storage Device

Figure 9:
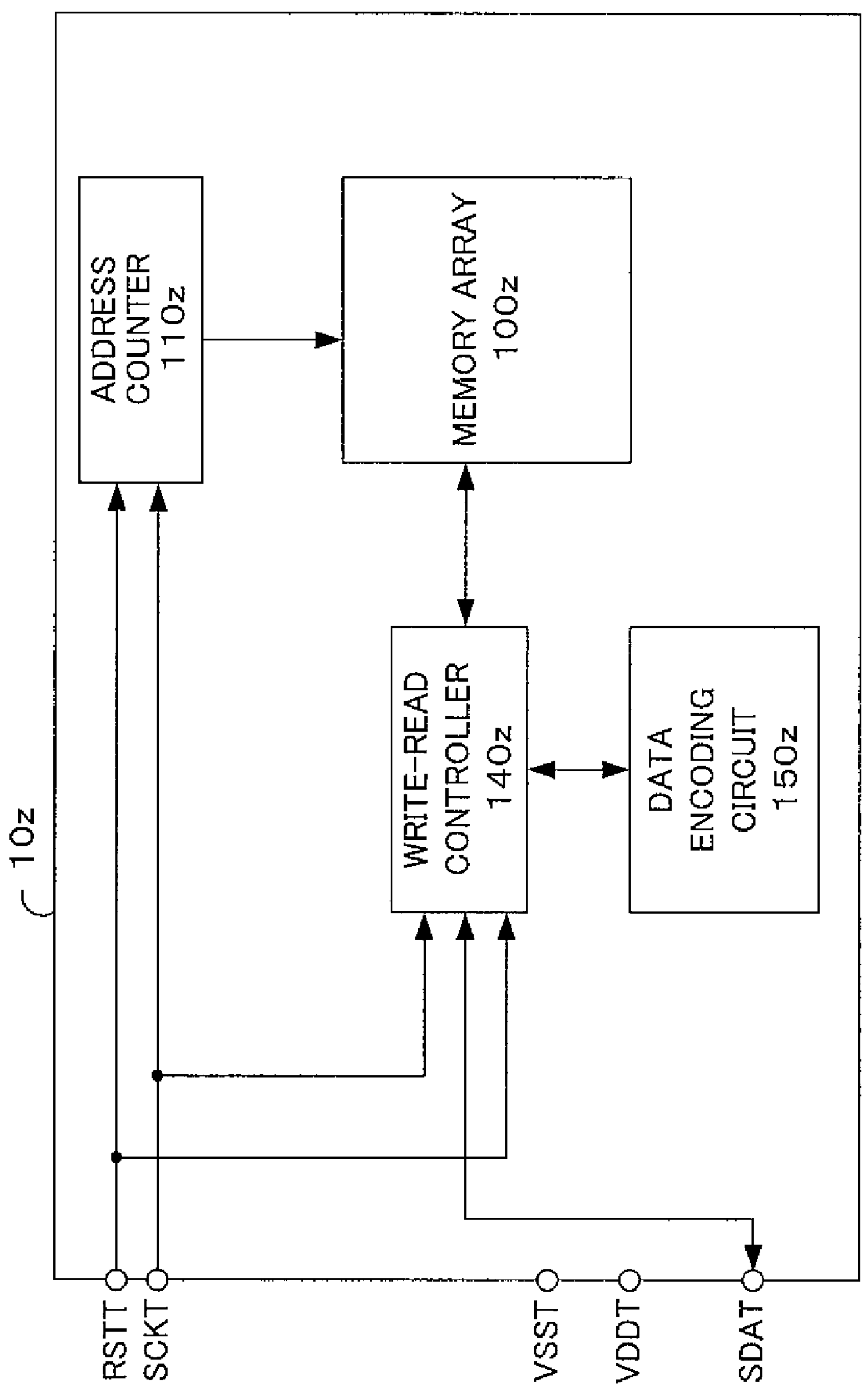
FIG. 9 is a block diagram showing the functional internal structure of a semiconductor storage device in a second embodiment of the invention.
Figure 10:
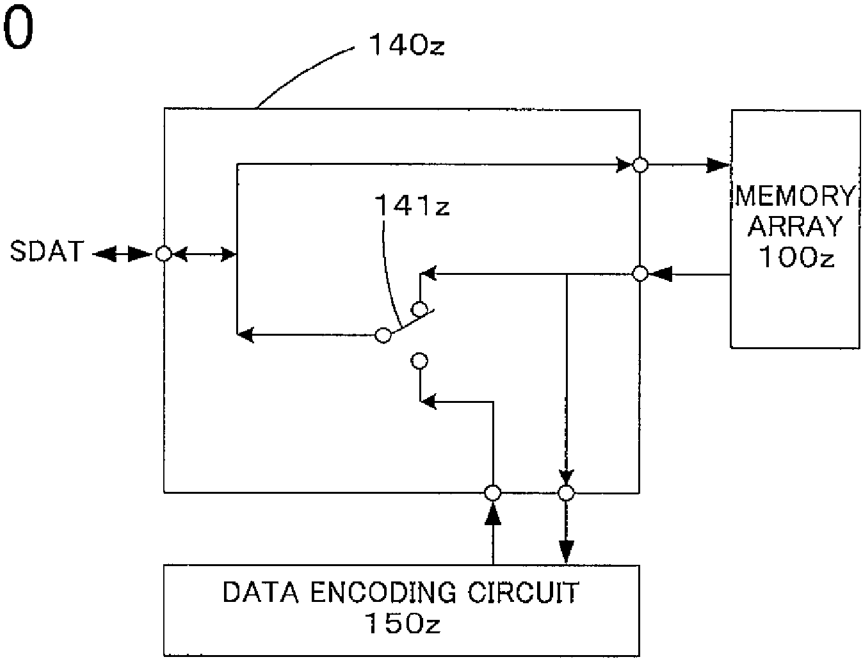
FIG. 10 is a block diagram showing the functional internal structure of a write-read controller in the second embodiment.
Figure 11:
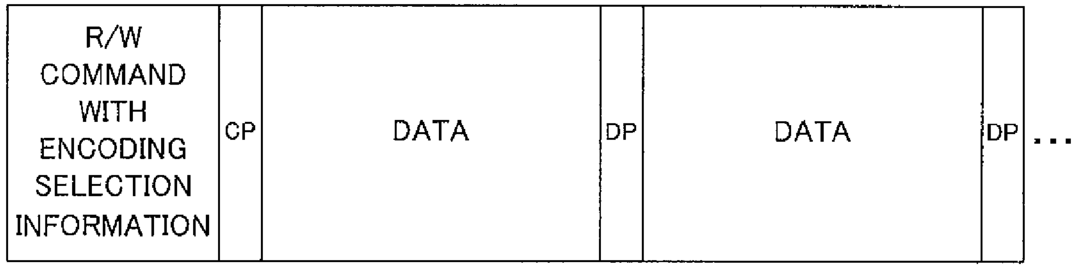
FIG. 11 is an explanatory view schematically showing one example of a data readout-demanding data array input into the semiconductor storage device of the second embodiment.

The structure of the semiconductor storage device of this embodiment is discussed below with reference to FIGS. 9 through 11. FIG. 9 is a block diagram showing the functional internal structure of the semiconductor storage device of this embodiment. FIG. 10 is a block diagram showing the functional internal structure of a write-read controller in the embodiment. FIG. 11 is an explanatory view schematically showing one example of a data readout-demanding data array input into the semiconductor storage device of the embodiment.

A semiconductor storage device 10*z* of the embodiment is constructed as a sequential access-type storage device that does not require external input of address data for specifying an address of access destination. The semiconductor storage device 10*z* includes a memory array 100*z* as a memory element, an address counter 110*z*, a write-read controller 140*z*, and a data encoding circuit 150*z*. The semiconductor storage device 10*z* is electrically connected with an external control device and has a data terminal SDAT for data communication as a communication unit. The respective circuits are interconnected by bidirectional bus signal lines. The combination of the write-read controller 140*z* with at least the data encoding circuit 150*z* is equivalent to the memory element controller of the invention.

The memory array 100*z* functioning as the memory element represents a storage area having the EEPROM characteristics of enabling data to be electrically written and erased. The memory array 100*z* includes a number of data cells (memory cells), each having the capacity for storing 1-bit information. A specific address unit of the memory array 100*z* is, for example, eight addresses (addresses of 8-bit data capacity) per row. In the structure having sixteen data cells (sixteen words) per column, the memory array 100*z* is capable of totally storing data of 16 words×8 bits (=128 bits).

The memory array 100*z* of this embodiment apparently has multiple rows of the 8-bit capacity. Each of the multiple rows is, however, not an independent data cell row, but rather one long data cell row is folded in the unit of 8 bits. Only as a matter of convenience, a row starting from a $9^{th}$ bit is called a $2^{nd}$ byte or row, and a row starting from a $17^{th}$ bit is called a $3^{rd}$ byte or row. A sequential access from the head bit is thus required to make access to a desired address in the memory array 100*z*. The sequential access system accordingly does not allow a direct access to a desired address, which is allowed in the random access system.

In the memory array 100*z*, word lines and bit (data) lines are connected to the respective data cells. The data writing procedure selects a word line (row) corresponding to a certain data cell (by application of a selected voltage) and applying a write voltage to a corresponding bit line to write data into the certain data cell. The data reading procedure selects a word line (row) corresponding to a certain data cell, connects a corresponding bit line with the write-read controller 140*z*, and identifies detection or no detection of electric current to read data (1 or 0) from the certain data cell. The specific address unit of this embodiment represents the number of addresses (the number of data cells), which enable data to be written in by application of a write voltage onto one word line.

The memory array 100*z* has a column selection circuit (not shown) that sequentially connects the columns (bit lines) with the write-read controller 140*z*, in response to an external clock pulse number counted by the address counter 110*z*. The memory array 100*z* also has a row selection circuit (not shown) that sequentially applies a selected voltage to the rows (word lines), in response to the external clock pulse number counted by the address counter 110*z*. As discussed above, the semiconductor storage device 10*z* of the embodiment does not make access to the memory array 100*z* based on the address data but rather makes access to a desired address according to the clock pulse number counted by the address counter 110*z*.

The address counter 110*z* is connected with a reset signal terminal RSTT, a clock signal terminal SCKT, the write-read controller 140*z*, and the memory array 100*z*. The address counter 110*z* is reset to an initial value by setting 0 (or a low level) to a reset signal input via the reset signal terminal RSTT. The address counter 110*z* counts the clock pulse number (increments the count) synchronously with a fall of each clock pulse input via the clock signal terminal SCKT after setting 1 to the reset signal.

The address counter 110*z* of this embodiment is an 8-bit address counter that stores eight clock pulse numbers corresponding to the number of data cells (the number of bits) per row in the memory array 100*z*. The initial value of the address counter 110*z* may be any value related to a head position of the memory array 100*z* and is typically equal to 0.

The write-read controller 140*z* is connected with the data encoding circuit 150*z*, the clock signal terminal SCKT, the data signal terminal SDAT, and the reset signal terminal RSTT. The write-read controller 140*z* is constructed as a circuit that checks write/read control information (W/R command with encoding selection information in a $1^{st}$ bit through a $5^{th}$ bit) included in a data array input via the data signal terminal SDAT synchronously with a $1^{st}$ clock signal after input of the reset signal RST (see FIG. 11) and changes over the internal operation of the semiconductor storage device 10*z* to one path selected among a write path and at least two read paths. As shown in FIG. 11, the data array input into the semiconductor storage device 10*z* of the embodiment includes the W/R command with encoding selection information in the first 5 bits and a command parity bit CP in a $6^{th}$ bit. The input data array as write data includes 8-bit write packet data (in a $7^{th}$ bit to a $14^{th}$ bit in the example of FIG. 11) and a data parity bit DP (in a $15^{th}$ bit in the example of FIG. 11). The data array may have multiple write packet data and multiple data parity bits DP added immediately after the respective write packet data.

The write-read controller 140*z* analyzes the obtained write/read control information and performs changeover control of a data transfer direction of the memory array 100*z* and a data transfer direction of the data signal terminal SDAT (more precisely, a data transfer direction of a signal line connecting with the data signal terminal SDAT) based on the result of the analysis. The write-read controller 140*z* has an 8-bit register (not shown) for temporarily storing 8-bit write data after an operation code included in write data that is input from the data signal terminal SDAT via a connecting input signal line, as well as a register (not shown) for storing data read from the memory array 100*z*.

A data array (MSB) input via the input signal line from the data signal terminal SDAT is sequentially stored in the 8-bit register until all 8 bits are occupied. When all 8-bits are occupied, the stored 8-bit data is written into the memory array 100*z*.

At a power-ON time or a reset time of the semiconductor storage device 10*z*, the write-read controller 140*z* sets the data transfer direction of the memory array 100*z* to a reading direction and makes the signal line connecting with the data signal terminal SDAT high impedance to prohibit data transfer via the data signal terminal SDAT. This state is kept until identification of a write demand based on the result of analysis of the obtained read/write control information. Data of a first bit in a data array input via the data signal terminal SDAT after the reset signal is accordingly not written into the memory array 100*z*, so that the first bit in the memory array 100*z* is kept in a read only state.

On the occasion of the writing operation, the write-read controller 140*z* changes over the data transfer direction of a bus signal line to a writing direction, in response to input of a specific number of clock pulses corresponding to an initial address in a writable area. In response to input of a specified number of clock pulses corresponding to an end address in the writable area, the write-read controller 140*z* changes over the data transfer direction of the bus signal line to a reading direction. A write voltage required for the writing operation is generated, for example, by a charge pump circuit (not shown).

On the occasion of the reading operation, the write-read controller 140*z* changes over the data transfer direction of the bus signal line to the reading direction, in response to input of the specific number of clock pulses corresponding to the initial address in the writable area.

The write-read controller 140*z* has a switch 141*z* functioning as a selector of selecting either raw readout data read from the memory array 100*z* or encoded readout data read from the memory array 100*z* and encoded by the data encoding circuit 150*z* as shown in FIG. 10. In response to a request for encoding the readout data from a host computer as a control device, the write-read controller 140*z* changes over the position of the switch 141*z* to output the encoded readout data. In the case of no request for encoding the readout data, the write-read controller 140*z* changes over the position of the switch 141*z* to output the raw readout data. The host computer without the capability of processing the encoded readout data uses the non-encoded, raw readout data to perform a desired series of processing without a request for data encoding. The host computer with the capability of processing the encoded readout data, on the other hand, uses the encoded readout data to perform a desired series of processing with a request for data encoding.

The data encoding circuit 150*z* is connected with the write-read controller 140*z* via a signal line. The data encoding circuit 150*z* uses the readout data input from the write-read controller 140*z* to perform an encoding process. The encoding process by the data encoding circuit 150*z* may, for example, perform a parity operation, a checksum operation, or a CRC (cyclic redundancy checksum) operation of all or part of the readout data. The data subjected to the encoding operation may be all readable data stored in the memory array 100*z* or may be target readout data as an object of a current data readout request. In this application, the data encoding circuit 150*z* generates a readout data array by addition of a parity value (parity bit) or a checksum value given as the result of the encoding operation. Not only the target data as the object of a data readout request but data lately written (or updated) irrespective of the data readout request or data updated at regular intervals may be subjected to the encoding operation. The encoding operation can accordingly give the combination of the varying readout data with the parity bit or the checksum value. This arrangement desirably enhances the uniqueness and the reliability of the readout data array.

The encoding process by the data encoding circuit 150*z* may encode the parity bit or the checksum value given as the result of the parity operation or the checksum operation of all or part of the readout data. In this application, the data encoding circuit 150*z* generates a readout data array by addition of the encoded parity bit or the encoded checksum value. Coding the parity bit or the checksum value given as the error correcting code enhances the detection accuracy of data corruption or data alteration in the course of communication, thus improving the reliability of the readout data array. In this application, not only the target data as the object of a data readout request but a checksum value or a parity bit obtained from the varying readout data or the lately written (or updated) data may be subjected to the encoding operation. This arrangement further improves the reliability of the readout data array. The subject of the encoding process may be the combination of the readout data and the parity bit or may be the result of verification of the readout data (expressed by a 1-bit value representing a verified status or a non-verified status).

The encoding process by the data encoding circuit 150z may calculate a hash value (hash coding) from the result of the encoding operation of all or part of the readout data according to a hash function. In this application, the data encoding circuit 150z generates a readout data array by addition of a hash value calculated from the parity bit, the checksum value, or the verification result of the readout data. Hash coding the parity bit, the checksum value, or the verification result of the readout data given as the error correction code enhances the detection accuracy of data corruption or data alteration in the course of communication, thus improving the reliability of the readout data array. In this application, not only the target data as the object of a data readout request but the checksum value, the parity bit, or the verification result obtained from the varying readout data or the lately written (or updated) data may be used for hash coding of calculating a hash value. This arrangement further improves the reliability of the readout data array. The hash value may be calculated from the combination of the readout data and the parity bit.

The subject of the encoding process is not restricted to the target data as the object of a data readout request but may be another data stored in the memory array 100z. One modified procedure may use the varying readout data or the lately written (or updated) data to compute a code value, such as a parity bit or a checksum value, and send the computed code value and the data used for computation of the code value, in addition to the target data as the object of a data readout request. This application relieves the load of the encoding operation and gives a different result at each readout timing by using the regularly updated data, so as to improve the reliability of the readout data. In the semiconductor storage device 10z having the high encoding capability, the subject of hash coding is not restricted to the error correcting code obtained as the result of the encoding operation but may be the combination of the readout data with the error correcting code. The readout data itself may be subjected to hash coding without computation of the error correcting code.

Typical examples of the regularly updated data include time data, date data, and control device operation-relating data to be managed by the control device. The data having a different value at each operation of the control device is usable as the subject of the encoding process. This arrangement enhances the uniqueness of the data and allows the highly reliable encoding operation.

One example of the circuit structure of the invention is shown in FIG. 10. A sending path from the memory array 100z is branched off into two pathways. One branch pathway of the sending path directly reaches the switch 141z. The other branch pathway of the sending path reaches the switch 141z via the data encoding circuit 150z. The data encoding circuit 150z is located between the memory array 100z and the switch 141z in the middle of the other branch pathway of the sending path. The output from the data encoding circuit 150z and the output from the memory array 100z are input into the switch 141z. The switch 141z selects one of these inputs and outputs the selected input to the data terminal SDA.

System Configuration Including Semiconductor Storage Device

Figure 12:
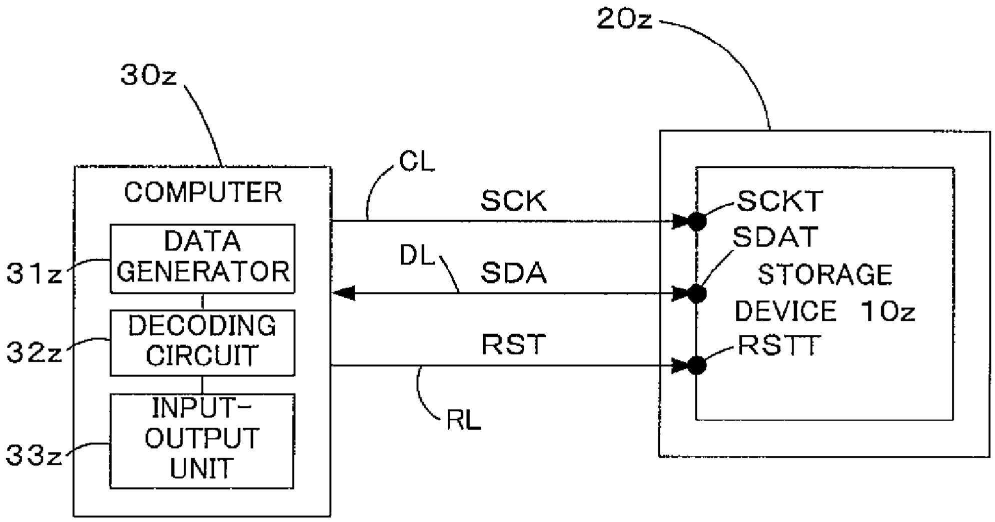
FIG. 12 is an explanatory view schematically illustrating the configuration of a system including the semiconductor storage device of the second embodiment and a computer.

FIG. 12 is an explanatory view schematically illustrating the configuration of a system including the semiconductor storage device 10z of the embodiment and a computer 30z. The semiconductor storage device 10z may be structured, for example, as an external storage device 20 connectable with the computer 30z via connection cables and connection terminals.

In the system of FIG. 12, the computer 30z is connected with the semiconductor storage device 10z by connection cables including a clock signal line CL, a data signal line DL, and a reset signal line RL. In another application, the semiconductor storage device 10z may have connection terminals that are directly connected with (attached to) connection terminals on the computer 30z. The computer 30z includes a data generator 31z, a decoding circuit 32z, and an input-output unit 33z mutually connected by internal wiring. The data generator 31z generates a data array including a readout command and an encoding request command.

Figure 14:
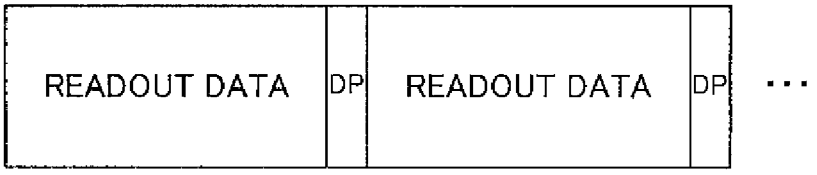
FIG. 14 is an explanatory view schematically showing one example of a readout data array output from the semiconductor storage device of the second embodiment.

The decoding circuit 32z is constructed to decode the encoded readout data received from each semiconductor storage device 10z and verify the correctness of the readout data (determine whether the readout data is not corrupted due to, for example, falsification or noise). In the application with addition of parity bits, readout data is verified as correct data when a 1-bit data parity bit DP added to every 8-bit readout data in the received data array as shown in FIG. 14 (discussed later) is identical with a parity bit calculated from the readout data. Otherwise the readout data is verified as incorrect data. In the application with addition of an encoded checksum value, verification of readout data is performed based on the readout data and a checksum value obtained by decoding the encoded checksum value with a key. In the application with addition of a hash value based on the verification result, readout data is verified as correct data when a hash value calculated from the result of a verification process of the readout data according to the hash function is identical with the hash value added to the readout data. Otherwise the readout data is verified as incorrect data. The verification may be performed by the decoding circuit 32z or may be performed by an exclusive verification circuit provided separately.

The input-output unit 33z is connected with the clock signal line CL, the data signal line DL, and the reset signal line RL to send a clock signal SCK and a reset signal RST to each semiconductor storage device 10z and to transmit a data signal SDA to and from each semiconductor storage device 10z.

Operations of Semiconductor Storage Device

Figure 13:
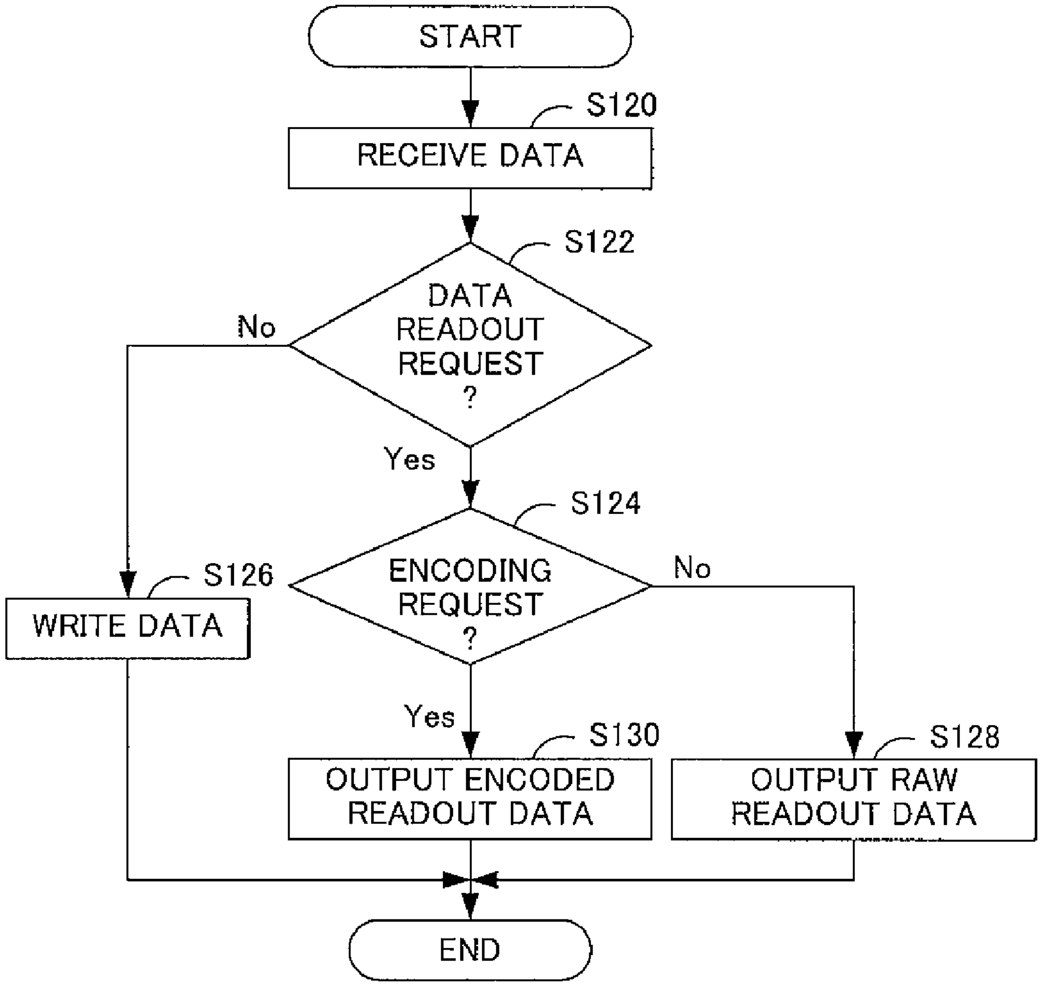
FIG. 13 is a flowchart showing a processing routine executed by the semiconductor storage device on the occasion of access control to the semiconductor storage device of the second embodiment.

The operations of the semiconductor storage device 10z of the embodiment are discussed with reference to FIGS. 13 and 14. FIG. 13 is a flowchart showing a processing routine executed by the semiconductor storage device on the occasion of access control to the semiconductor storage device of the embodiment. FIG. 14 is an explanatory view schematically showing one example of a readout data array output from the semiconductor storage device of the embodiment.

The semiconductor storage device 10z constructed as the external storage device 20z receives data from the computer 30z (step S120) and determines whether there is a data readout request for the received data (step S122). According to a concrete procedure, the write-read controller 140z analyzes a read/write command bit with encoding selection information written at the 1$^{st}$ bit in the received data array and identifies whether the analyzed read/write command bit represents a data write request or a data readout request.

Upon determination that there is no data readout request for the received data but there is a data write request for the receive data (step S122: no), the semiconductor storage device 10z writes the received data into the memory array 100z (step S126) and terminates the processing routine. According to a concrete procedure of data writing, the write-read controller 140z writes the data at a desired address in the memory array 100z as explained previously.

Upon determination that there is a data readout request for the received data (step S122: yes), on the other hand, the semiconductor storage device 10z determines whether there is an encoding request of the readout data (step S124). According to a concrete procedure, the write-read controller 140z analyzes the W/R command with encoding selection information written in the 1st through the 5th bit of the received data array to identify the presence or the absence of an encoding request as explained previously.

Upon determination that there is no encoding request of the readout data (step S124: no), the semiconductor storage device 10z outputs the raw readout data read from the memory array 100z to the data signal terminal SDAT (step S128) and terminates the processing routine. According to a concrete procedure, the write-read controller 140z changes over the position of the switch 141z to output the raw readout data read from the memory array 100z to the data signal terminal SDAT as explained previously.

Upon determination that there is an encoding request of the readout data (step S124: yes), on the other hand, the semiconductor storage device 10z outputs the encoded readout data to the data signal terminal SDAT (step S130) and terminates the processing routine. According to a concrete procedure, the write-read controller 140z changes over the position of the switch 141z to output the encoded readout data read from the memory array 100z and encoded by the data encoding circuit 150z to the data signal terminal SDAT. In the application of the encoding operation with parity bits, the readout data sent to the computer 30z includes a data parity bit DP written immediately after every 8-bit readout data as shown in FIG. 14. In the application of the encoding operation of a checksum value, the readout data sent to the computer 30z includes an encoded checksum value, in place of the data parity bit DP shown in the example of FIG. 14.

As discussed above, the semiconductor storage device 10z of the embodiment outputs the encoded readout data in response to an encoding request of the readout data, while outputting the raw readout data read from the memory array 100z in response to no encoding request of the readout data. Namely the readout data can be output in two different formats on the basis of whether the computer 30z is capable of processing the encoded readout data. This arrangement desirably improves the adaptability of the semiconductor storage device 10z.

The same semiconductor storage device 10z is usable for both the computer 30z with the encoded data processability and the computer 30z without the encoded data processability. The encoding operation of the readout data is performed for the computer 30z with the encoded data processability to enhance the reliability of data communication between the semiconductor storage device 10z and the computer 30z. The raw readout data read from the semiconductor storage device 10z is sent to the computer 30z without the encoded data processability. Namely the semiconductor storage device 10z of this structure ensures the reliability of data communication according to the function of the computer 30z as the attachment target of the semiconductor storage device 10z. This arrangement effectively controls an increase in number of different types of semiconductor storage devices 10z, thus restricting or preventing the user's confusion in purchase and use of products and an increase in manufacturing cost or sales management cost of the semiconductor storage device 10z.

Upon detection of an error in readout data as a result of a decoding operation, the computer 30z with the semiconductor storage device 10z of the embodiment attached thereto does not perform series of operations using the readout data, for example, a database processing. This arrangement desirably prevents potential troubles caused by erroneous data. One example of the potential trouble caused by the erroneous trouble is incorrect accounting.

Figure 15:
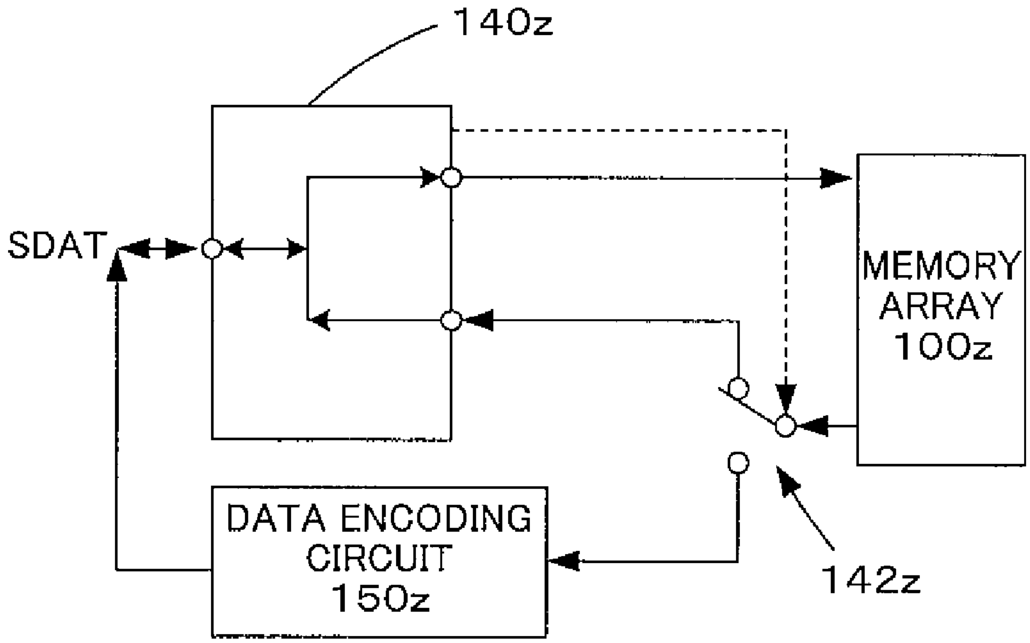
FIG. 15 is a block diagram showing another configuration of the write-read controller and the data encoding circuit in one modified example of the second embodiment.

Other Aspects of Second Embodiments (1) In the structure of the embodiment discussed above, the write-read controller 140z changes over the position of the switch 141z to output either the encoded readout data or the raw readout data (non-encoded readout data) to the data signal terminal SDAT. In one modified structure shown in FIG. 15, the write-read controller 140z may change over the position of a switch 142z structured to output readout data read from the memory array 100z directly or via the data encoding circuit 150z to the data signal terminal SDAT. FIG. 15 is a block diagram showing another configuration of the write-read controller and the data encoding circuit in one modified example. The write-read controller 140z reads out data from the memory array 100z and determines whether the readout data is to be output to the data encoding circuit 150z. In this modified structure, the switch 142z is provided in the middle of the pathway between the memory array 100z and the data encoding circuit 150z. A signal line from the memory array 100z is electrically connected with the switch 142z, while a signal line from the switch 142z is electrically connected both with the data encoding circuit 150z and with the data terminal SDAT. The switch 142z functions as a selector to select an output destination of the readout data read from the memory array 100z between the data terminal SDAT and the data encoding circuit 150z.

(2) The above embodiment describes the semiconductor storage device 10z including the sequential access-type memory array 100z. The structure of the embodiment gives the similar effects to a semiconductor storage device including a random access-type memory array or a flash memory. The semiconductor storage device with the random access-type memory array analyzes an operation code and specifies a row address and a column address by a RAS signal and a CAS signal to read out data from a desired address. In the semiconductor storage device with the flash memory, a memory controller converts a logic address specified by the computer 30z into a physical address to read out data from a desired address. In the semiconductor storage device with the random access-type memory array, an address signal line may be provided separately from a data signal line. The semiconductor storage device 10z constructed as the external storage device may be connected with the computer 30z by any of various communication cables including a USB cable, a serial cable, an IEEE1394 cable or may be connected directly with the computer 30z via any of various terminals including a USB terminal, a serial terminal, and an IEEE1394 terminal. In this application, the semiconductor storage device 10z further requires a communication controller to control data transmission to and from the computer 30z. The unit of data writing may be one bit or one block, in place of one byte. In this modified application, several bits including one desired bit may be subjected to the encoding operation.

(3) In the structure of the embodiment discussed above, the single semiconductor storage device 10z is connected to the computer 30z via the signal lines. In one modified application, multiple semiconductor storage devices 10z may be bus-connected to the computer 30z. In this application, each of the multiple semiconductor storage devices 10z is identified by identification information assigned thereto. One of the multiple semiconductor storage devices 10z is specified as the output source of each readout data by referring to the identification information.

(4) In the structure of the embodiment discussed above, the data encoding circuit 150*z* is provided separately from the write-read controller 140*z*. In one modified structure, the data encoding circuit 150*z* may be incorporated in the write-read controller 140*z*.

(5) The semiconductor storage device 10*z* may add encoding identification data to the readout data (data array). The encoding identification data shows whether the readout data has been subjected to the encoding operation performed by the data encoding circuit 150*z*. In this modified application, the encoding identification data is used to readily determine whether the readout data is encoded.

(6) In the structure of the embodiment discussed above, there is an electrical contact of the terminals for data communication between the printing apparatus and the liquid container. In one modification, a contactless communication technique, such as RFID may be adopted for the data communication between the computer and the semiconductor storage device. In this modified application, a wireless communication antenna, such as an IC tag may be adopted for communication.

Third Embodiment

Encoding System Configuration

Figure 16:
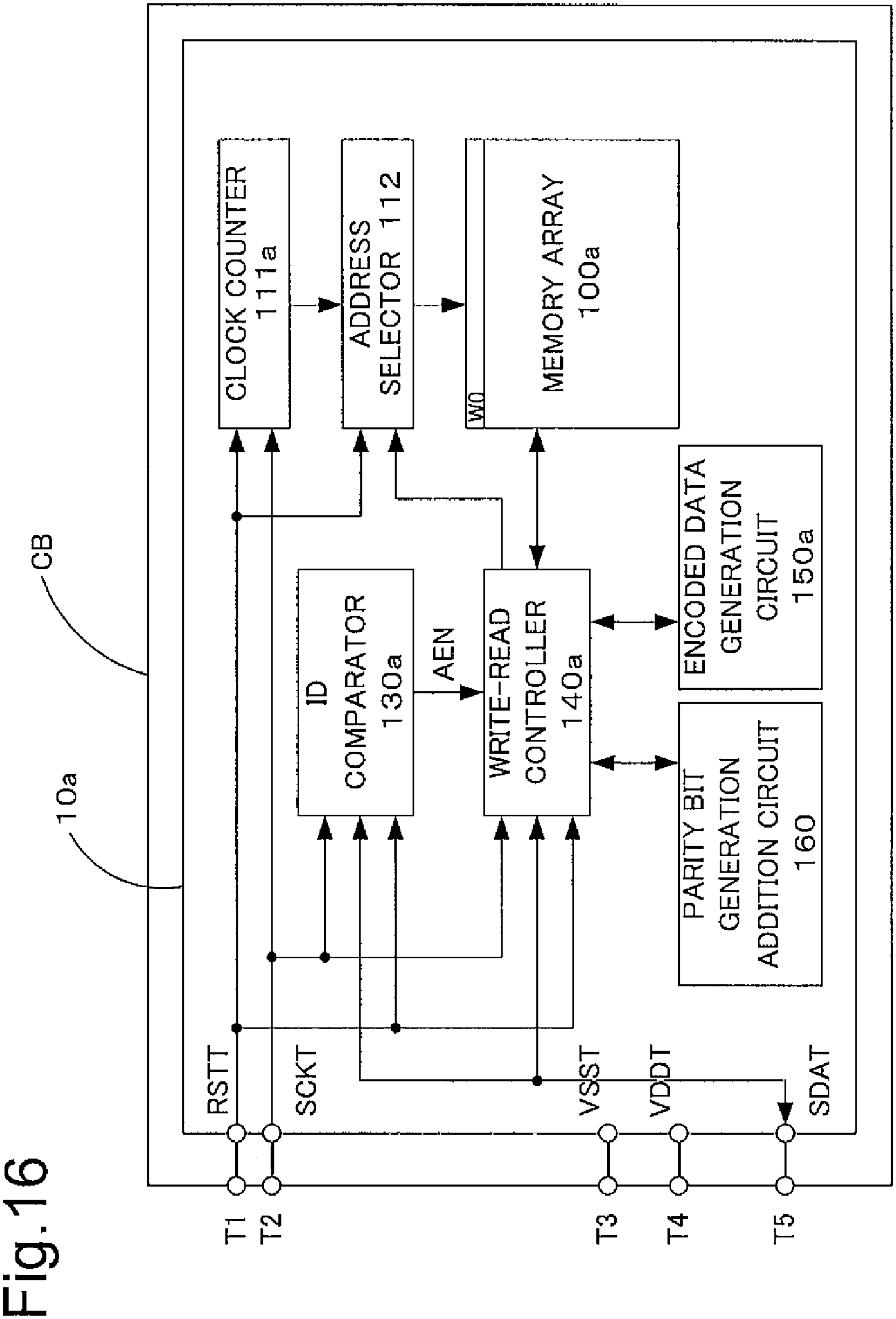
FIG. 16 is a block diagram showing the functional internal structure of a semiconductor device mounted on a circuit board in a third embodiment of the invention.
Figure 17:
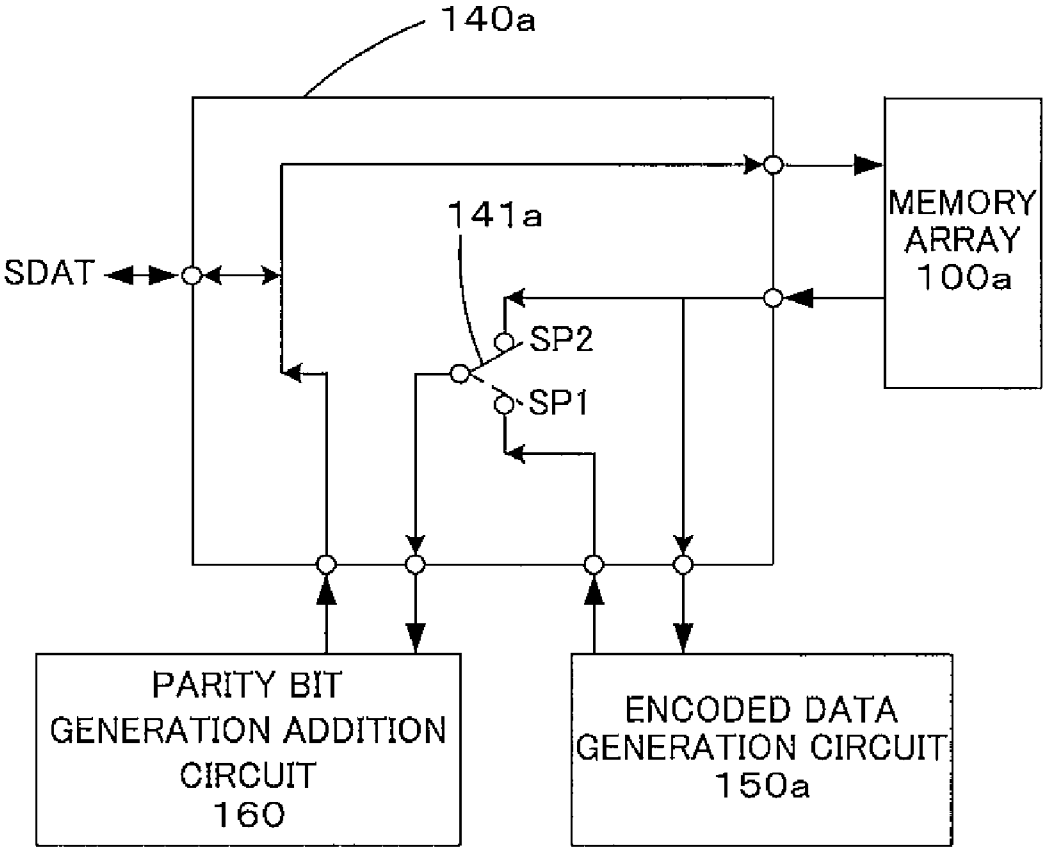
FIG. 17 is a block diagram showing the functional internal structure of a write-read controller in the third embodiment.

FIG. 16 is a block diagram showing the functional internal structure of a semiconductor device mounted on a circuit board in a third embodiment of the invention. FIG. 17 is a block diagram showing the functional internal structure of a write-read controller in the embodiment. Like the semiconductor storage device of the first embodiment, the semiconductor device of the third embodiment is connected to a printing apparatus and is operated by an access (for example, a writing access or a reading access) from the printing apparatus.

A semiconductor device 10*a* of the embodiment includes a memory array 100*a*, a clock counter 111*a*, an address selector 112, an ID comparator 130*a*, a write-read controller 140*a*, an encoded data generation circuit (verification data generation circuit) 150*a*, and a parity bit generation addition circuit 160. The combination of the write-read controller 140*a* with at least the ID comparator 130*a* and the encoded data generation circuit 150*a* is equivalent to the memory controller (memory element controller) of the invention. In the structure of this embodiment, the semiconductor device 10*a* is mounted on a circuit board CB. The circuit board CB is provided in a liquid container for storing a recording material (recording agent) of the printing apparatus. On attachment of the liquid container to the printing apparatus, the semiconductor device 10*a* is electrically connected with the printing apparatus. A reset signal terminal RSTT, a clock signal terminal SCKT, power supply terminals VDDT and VSST, and a data signal terminal SDAT of the semiconductor device 10*a* are electrically connected with corresponding external terminals T on the circuit board CB or more specifically with an external reset signal terminal T1, with an external clock signal terminal T2, with external power supply terminals T3 and T4, and with an external data signal terminal T5, respectively. A reset signal, a clock signal, and a power supply voltage are supplied from the printing apparatus to the reset signal terminal RSTT, to the clock signal terminal SCKT, and to the power supply terminals VDDT and VSST, respectively. The semiconductor device 10*a* of this embodiment is initialized to an initial state at a low level of the reset signal and is activated by cancellation of the initial state to allow an access from the printing apparatus at a rise of the reset signal to a high level.

The memory array 100*a* (memory element) basically has the same structure as that of the memory array 100 used in the first embodiment. The memory array 100*a* of the embodiment stores identification information ID of the semiconductor device 10*a* at a row selected first by the address selector 112 after a start of an access by a controller of the printing apparatus. The identification information ID is used to select one semiconductor device as an access destination from the printing apparatus among multiple semiconductor devices bus-connected to the printing apparatus.

Under control of the write-read controller 140*a*, data is written into or read out from a specific row (word line) in the memory array 100*a* that is specified by a row selection signal output from the address selector 112. In the memory array 100*a* of the embodiment, 8-bit cells are selected for each specific row. Data is accordingly read out from or written into the specific row selected by the row selection signal in the unit of 8-bit memory cells.

The clock counter 111*a* is connected with the reset signal terminal RSTT, the clock signal terminal SCKT, the write-read controller 140*a*, and the address selector 112. The clock counter 111*a* is reset to an initial value at a level '0' (or a low level) of the reset signal input via the reset signal terminal RSTT and counts the number of clock pulses (increments or decrements the count value) synchronously with a fall of each external clock pulse input via the clock signal terminal SCKT at a level '1' of the reset signal. The initial value of the clock counter 111*a* may be any value correlated to a specific value of selecting a W0 row ($1^{st}$ row) for storage of the identification information ID in the memory array 100*a* and is typically equal to 0. The clock counter 111*a* divides the frequency of the external clock pulses to generate an address counting clock and outputs the generated address counting clock to the address selector 112. The clock counter 111*a* divides the frequency of the external clock pulses at a different cycle according to the type of an access, that is, either a reading access or a writing access. For a writing access, one pulse of the address counting clock is generated from eight external clock pulses. For a reading access, one pulse of the address counting clock is generated from nine external clock pulses.

The address selector 112 is connected with the reset signal terminal RSTT, the write-read controller 140*a*, the clock counter 111*a*, and the memory array 100*a*. The address selector 112 counts the number of pulses of the address counting clock output from the clock counter 111*a* and generates a row selection signal corresponding to the count value. The row selection signal is used to directly select (or specify) a desired row in the memory array 100*a*. The count value counted by the address selector 112 is initialized to its initial value at a low level of the reset signal ('reset low' level). The initial value of the initialized count is used to generate the row selection signal for selecting the $1^{st}$ row in the memory array 100*a*. The address selector 112 outputs the row selection signal to the memory array 100*a* under control of the write-read controller 140*a*.

The ID comparator 130*a* is connected with the clock signal terminal SCKT, the data signal terminal SDAT, the reset signal terminal RSTT, and the write-read controller 140*a*. After cancellation of the initial state of the semiconductor device 10*a*, the ID comparator 130*a* compares identification information ID included in a data array sent from the controller of the printing apparatus and input via the data signal terminal SDAT with identification information ID stored in advance in the memory array 100*a* to perform ID matching. According to a concrete procedure of ID matching, the ID comparator 130*a* obtains identification information ID or data in first 3 bits included in the data array input after the reset signal RST of the high level. At the same timing, the ID comparator 130*a* obtains identification information ID included in a specific row selected in response to the initial value of the count by the address selector 112 via the write-read controller 140*a*. The ID comparator 130*a* then determines whether the data in the first 3 bits included in the data array sent from the printing apparatus (the identification information ID for specifying the semiconductor device 10*a* as the access destination of the printing apparatus) is identical with the identification information ID read from the memory array 100*a*. In the case of matching of the two pieces of identification information IDs, the ID comparator 130*a* outputs an access enable signal AEN to the write-read controller 140*a*. In the case of mismatching of the two pieces of identification information IDs, on the other hand, the ID comparator 130*a* does not output the access enable signal AEN. Upon mismatching of the two IDs, the semiconductor device 10*a* is returned to the initial state by input of the reset signal (equal to the level '0') without performing either a writing access or a reading access.

The write-read controller 140*a* is connected with the memory array 100*a*, the address selector 112, the ID comparator 130*a*, the encoded data generation circuit 150*a*, the parity bit generation addition circuit 160, the clock signal terminal SCKT, the data signal terminal SDAT, and the reset signal terminal RSTT. The write-read controller 140*a* basically has the same structure as that of the write-read controller 140 used in the first embodiment. The write-read controller 140*a* has an 8-bit register (not shown) for temporarily storing a write data array included in a transmitted data array (corresponding to a data array of FIG. 23) input from the data signal terminal SDAT at the time of writing data, as well as a register (not shown) for storing data read from the memory array 100*a*. A data array (MSB) input via an input signal line from the data signal terminal SDAT is sequentially stored in the 8-bit register until all 8 bits are occupied. When all 8-bits are occupied, the stored 8-bit data is written into the memory array 100*a*.

The write-read controller 140*a* analyzes a command (written in a $4^{th}$ bit to an $8^{th}$ bit in the transmitted data array), which is received subsequent to the identification information ID from the printing apparatus and represents the type of an access to the semiconductor device 10*a*, and determines whether the access from the printing apparatus to the semiconductor device 10*a* is a data write request (the received command is a data write command), is an ordinary data readout request (the received command is an ordinary data readout command), or is an encoded data readout request (the received command is an encoded data readout command or a verification data generation command). The write-read controller 140*a* is equivalent to the encoding requirement determination unit of the invention. In response to the access enable signal AEN from the ID comparator 130*a*, the write-read controller 140*a* performs either a writing operation or a reading operation based on the result of analysis of the received command.

On cancellation of the initial state of the semiconductor device 10*a* in response to power supply to the semiconductor device 10*a*, the write-read controller 140*a* sets the data transfer direction of the memory array 100*a* to a reading direction and prohibits data transmission from the semiconductor device 10*a* to the printing apparatus. This state is kept until either a writing operation or a reading operation is performed on the basis of the result of analysis of the access type (command). While the data of the transmitted data array input via the data signal terminal SDAT after input of the reset signal is not written into the memory array 100*a*, the data (identification information ID) stored in the first 3 bits of the memory array 100*a* is sent to the ID comparator 130*a*. The first row of the memory array 100*a* is accordingly set in a read only state.

The write-read controller 140*a* has a switch 141*a* functioning as a selector to selectively output either raw readout data (ordinary data) read from the memory array 100*a* or encoded readout data (encoded data) read from the memory array 100*a* and encoded by the encoded data generation circuit 150*a*. When the command included in the data array received from the printing apparatus is an encoded data readout command, the write-read controller 140*a* changes over the position of the switch 141*a* to an encoding position SP1 to output the encoded readout data. When the command included in the data array is an ordinary data readout command, the write-read controller 140*a* changes over the position of the switch 141*a* to an ordinary position SP2 to output the raw readout data. Namely data is transferred by different pathways between the memory array 100*a* and the data signal terminal SDAT at the time of reading out the encoded data and at the time of reading out the ordinary data.

The encoded data generation circuit 150*a* is connected with the write-read controller 140*a* via a signal line. The encoded data generation circuit 150*a* performs an encoding process for multiple lines of readout data input from the write-read controller 140*a*. The encoding process performed by the encoded data generation circuit 150*a* carries out a checksum operation of the multiple lines of readout data to generate 8-bit checksum data (first encoding operation). In the embodiment, the data (ordinary data) as the encoding object include ink amount data (ink remaining amount data or consumed ink amount data) that is updated by the controller of the printing apparatus with the progress of a printing operation) and data relating to manufacture of an ink cartridge that is used for only the data readout and is not updated by the controller of the printing apparatus with the progress of a printing operation. The encoded data generation circuit 150*a* performs a reversible encoding operation of the generated checksum data to generate encoded data (verification data). One modified procedure of the encoding process may perform an arithmetic operation of the readout data as the encoding object according to a hash function to obtain an irreversible hash value, in place of the checksum data. The generated verification data is output to the write-read controller 140*a*.

The parity bit generation addition circuit 160 is connected with the write-read controller 140*a*. The parity bit generation addition circuit 160 receives either the verification data generated by the encoded data generation circuit 150*a* or the non-encoded ordinary data (ordinary readout data) from the write-read controller 140*a* and generates a parity bit from the received verification data or the received ordinary readout data. The parity bit generation addition circuit 160 adds the generated parity bit to the received verification data or the received ordinary readout data and sends the resulting data to the write-read controller 140*a*. The parity bit is generated from every 8-bit data array of the received ordinary readout data or from a data array of the received verification data. In the embodiment, generation of the parity bit from the data array and addition of the generated parity bit to the data array performed by the parity bit generation addition circuit 160 are not regarded as the encoding operation of the data array.

Structures of Ink Cartridge and Printing Apparatus

Figure 18:
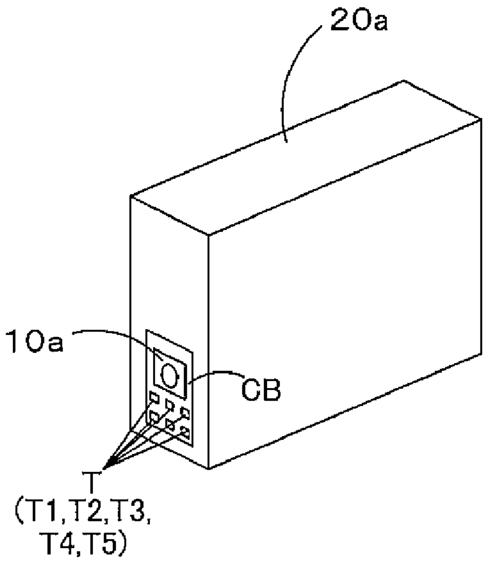
FIG. 18 is an explanatory view schematically illustrating the structure of an ink cartridge as one example of the liquid container.
Figure 19:
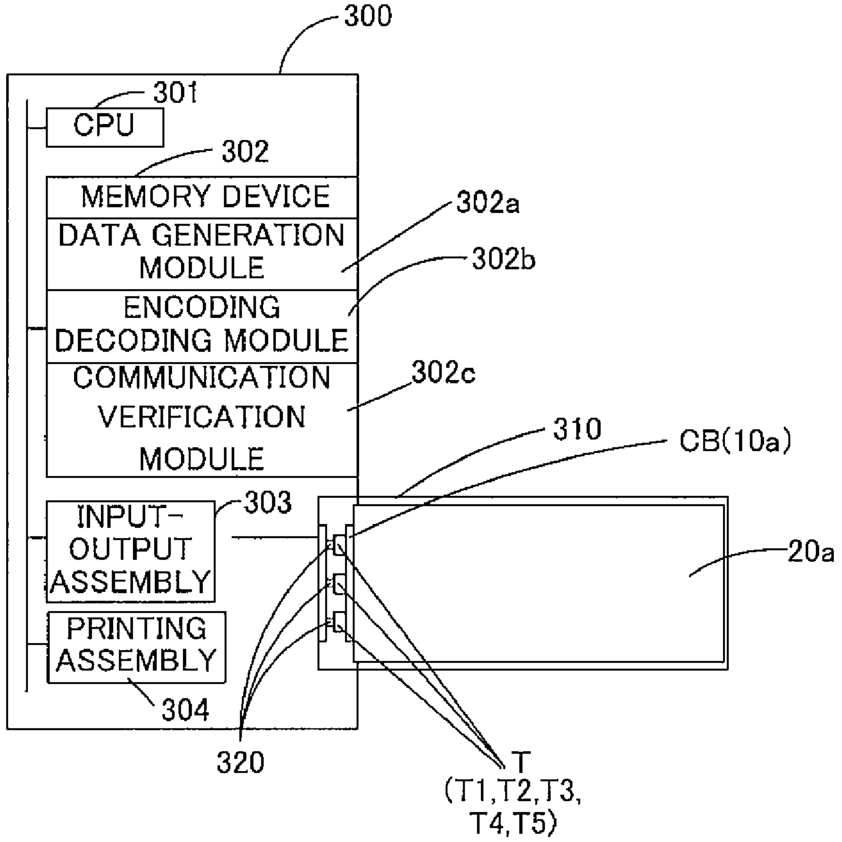
FIG. 19 is an explanatory view showing connection of the ink cartridge with a printing apparatus in the third embodiment.

FIG. 18 is an explanatory view schematically illustrating the structure of an ink cartridge as one example of the liquid container. FIG. 19 is an explanatory view showing connection of the ink cartridge with a printing apparatus in the embodiment.

An ink cartridge 20*a* has the circuit board CB with the semiconductor device 10*a* mounted thereon as discussed above and an ink chamber (not shown). A printing apparatus 300 includes an attachment assembly 310 structured to receive the ink cartridge 20*a* attached thereto in a detachable manner and printing apparatus terminals 320 that are connected with external terminals T (T1 through T5) of the ink cartridge 20*a*. The attachment assembly 310 may be located on a carriage (on-carriage type) or may be located at any arbitrary position other than on the carriage (off-carriage type). In one modified structure, the ink cartridge 20*a* may be located on the attachment assembly 310 provided outside of the printing apparatus 300. In another modified structure, only the circuit board CB may be attached to the attachment assembly 310 provided inside of the printing apparatus 300, and the main body of the ink cartridge 20*a* may be located outside of the printing apparatus 300.

The printing apparatus 300 includes a central processing unit (CPU) 301, a memory device 302 like a ROM and a RAM, an input-output assembly 303, and a printing assembly 304. The CPU 301, the memory device 302, the input-output assembly 303, and the printing assembly 304 are interconnected by an internal bus to allow bidirectional communication. A data generation module 302*a*, an encoding decoding module 302*b* configured to encode or decode data, and a communication verification module 302*c* configured to verify communication are stored in the ROM of the memory device 302. The data generation module 302*a* is configured to generate a data array for data writing (including identification information ID, a data write command, and a write data array to be written into the memory array), a data array for ordinary data readout (including identification information ID and an ordinary data readout command) to read out the raw readout data from the memory array, or a data array for encoded data readout (including identification information ID and an encoded data readout command) to read out the encoded data obtained by the encoding operation of the data read out from the memory array (that is, to receive verification data generated from the data read out from the memory array). The RAM of the memory device 302 is structured to temporarily store data read from the semiconductor device 10*a*, generated write data, and data required for execution of the respective modules. The CPU 301 executes the data generation module 302*a*, the encoding decoding module 302*b*, and the communication verification module 302*c* to respectively function as a unit for ordinary data readout, encoded data readout, and data writing, an encoding decoding unit, and a verification unit. The functions of the respective modules executed by the CPU 301 may be actualized by the hardware configuration. The input-output assembly 303 is connected with the printing apparatus terminals 320 and is structured to send data to the semiconductor device 10*a* provided in the ink cartridge 20*a* and receive data from the semiconductor device 10*a*. The printing assembly 304 includes at least a print head mounted on a carriage and a feeder mechanism arranged to feed a printing medium (printing paper) in a sub-scanning direction. Ink supplied from the ink cartridge 20*a* is ejected from the print head to create an image on the printing medium. The CPU 301, the memory device 302, and the input-output assembly 303 of the printing apparatus 300 may collectively be referred to as the controller of the printing apparatus 300. On conclusion of every access to the semiconductor device 10*a*, the controller of the printing apparatus 300 sends a reset signal via a reset signal terminal to the semiconductor device 10*a* to initialize the semiconductor device 10*a* to the initial state.

The printing apparatus 300 may be equipped with a single ink cartridge 20*a* or with multiple ink cartridges 20*a*. In the latter case, the semiconductor devices 10*a* provided in the respective ink cartridges 20*a* are bus-connected to the controller of the printing apparatus 300 as shown in FIG. 4.

Communication Verification Process

Figure 20:
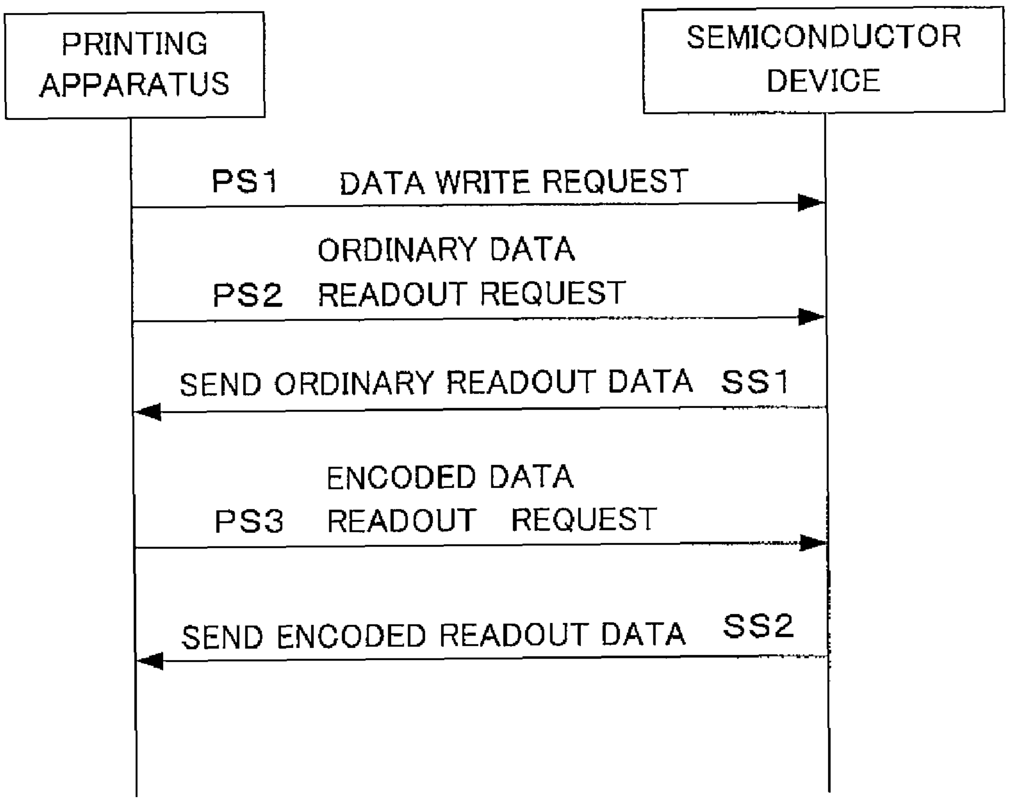
FIG. 20 is an explanatory view showing one example of a communication verification process performed between the printing apparatus and the semiconductor device in the third embodiment.
Figure 21:
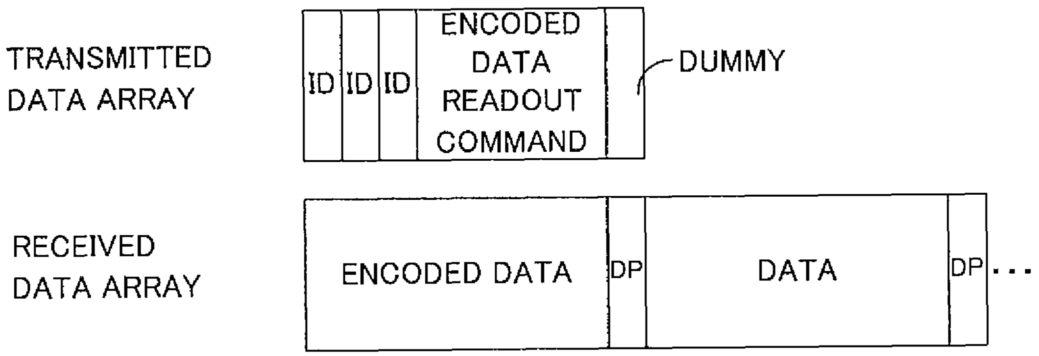
FIG. 21 is an explanatory view showing one example of a data array sent from the printing apparatus to the semiconductor device of the third embodiment at the time of data writing.
Figure 22:
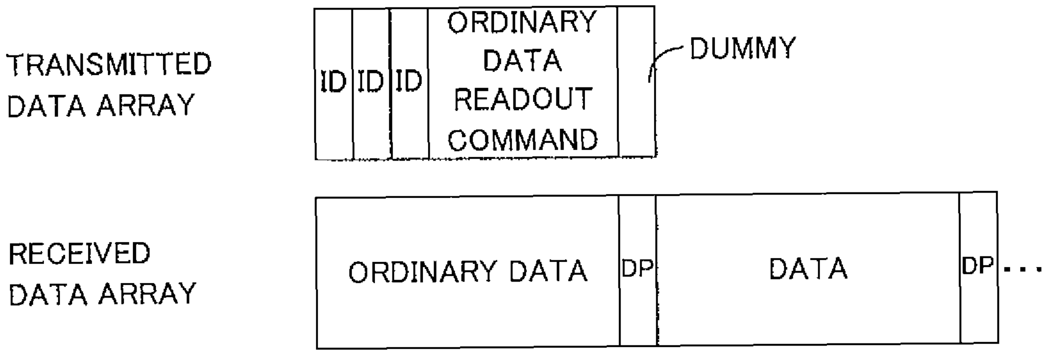
FIG. 22 is an explanatory view showing one example of a data array transmitted between the printing apparatus and the semiconductor device of the third embodiment at the time of ordinary data readout.
Figure 23:
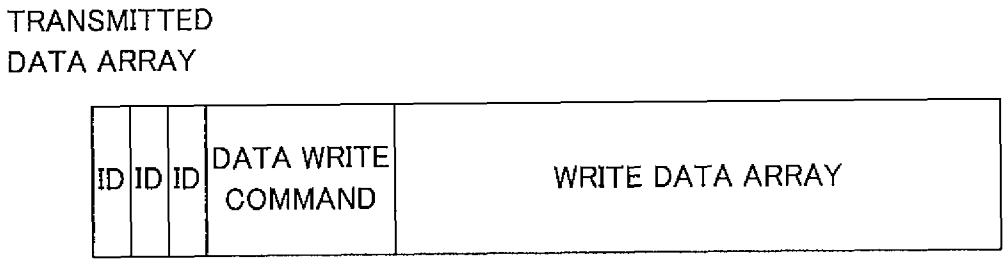
FIG. 23 is an explanatory view showing one example of a data array transmitted between the printing apparatus and the semiconductor device of the third embodiment at the time of encoded data readout.
Figure 24:
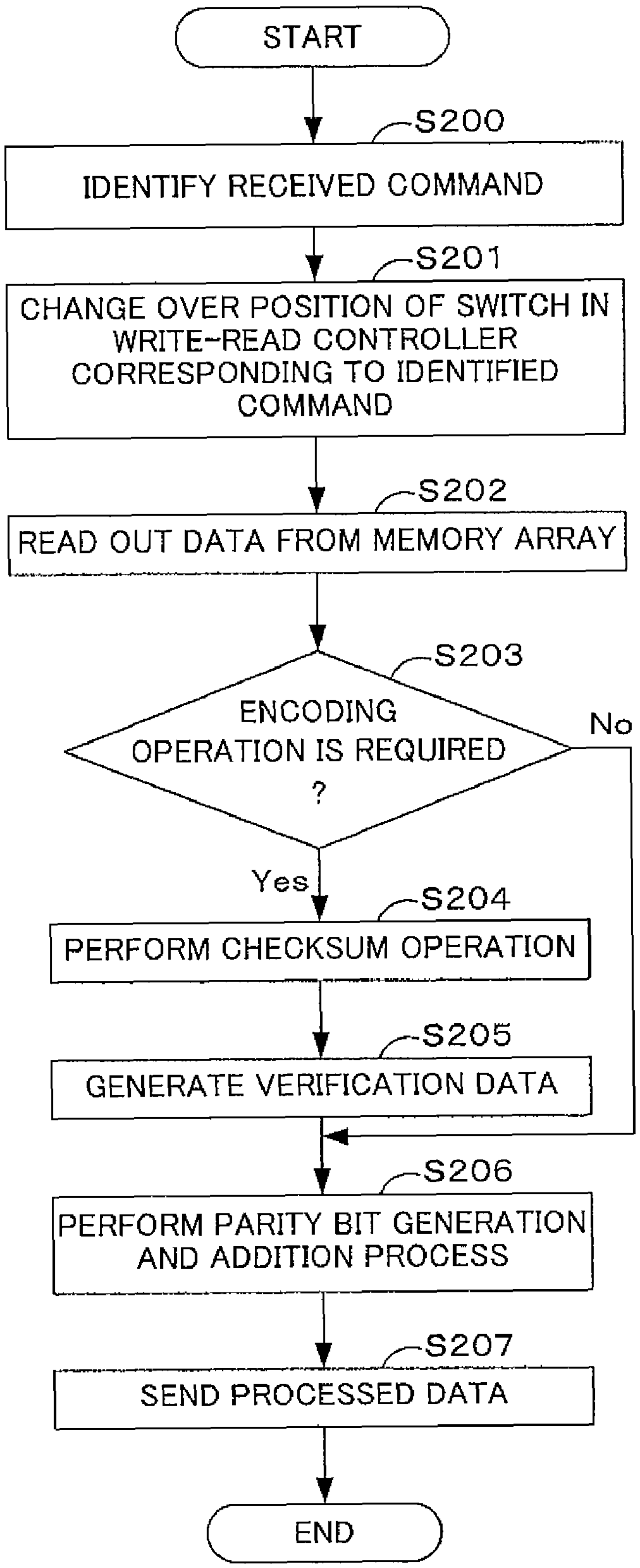
FIG. 24 is a flowchart showing an encoded data generation and transmission process performed by the semiconductor device of the third embodiment.
Figure 25:
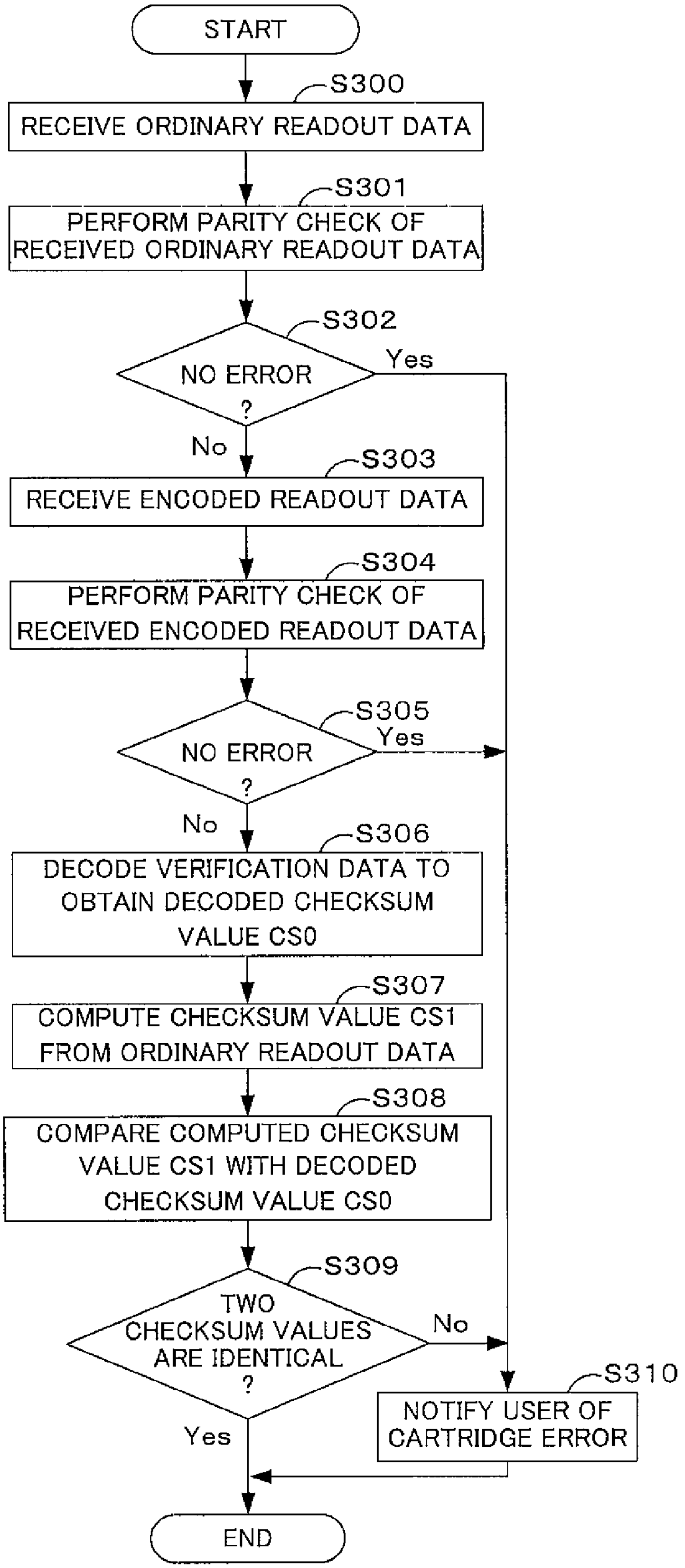
FIG. 25 is a flowchart showing a verification process performed by the printing apparatus in the third embodiment.

FIG. 20 is an explanatory view showing one example of a communication verification process performed between the printing apparatus and the semiconductor device in the embodiment. FIG. 21 is an explanatory view showing one example of a data array sent from the printing apparatus to the semiconductor device of the embodiment at the time of data writing. FIG. 22 is an explanatory view showing one example of a data array transmitted between the printing apparatus and the semiconductor device of the embodiment at the time of ordinary data readout. FIG. 23 is an explanatory view showing one example of a data array transmitted between the printing apparatus and the semiconductor device of the embodiment at the time of encoded data readout. FIG. 24 is a flowchart showing an encoded data generation and transmission process performed by the semiconductor device of the embodiment. FIG. 25 is a flowchart showing a verification process performed by the printing apparatus in the embodiment.

The outline of the communication verification process performed between the printing apparatus 300 and the semiconductor device 10*a* is described below with reference to FIG. 20. The printing apparatus 300 updates the ink amount data of the semiconductor device 10*a* in the course of consumption of ink as a recording agent used for a printing operation or a print head cleaning operation. The data generation module 302*a* of the printing apparatus 300 generates a data array for requiring data writing as a transmitted data array shown in FIG. 21 to update the ink amount data and sends a data write request to the semiconductor device 10*a* (PS1). The transmitted data array for requiring data writing shown in FIG. 21 includes three pieces of 1-bit identification information ID, a 5-bit data write command, and a preset-bit write data array. The data generation module 302*a* of the printing apparatus 300 generates a data array for requiring ordinary data readout as a transmitted data array shown in FIG. 22 and sends an ordinary data readout request to the semiconductor device 10*a* (PS2) to read out the ordinary data including the ink amount data. The transmitted data array for requiring ordinary data readout shown in FIG. 22 includes three pieces of 1-bit identification information ID, a 5-bit ordinary data readout command, and a 1-bit dummy bit. The ordinary data readout request is to read out data (ordinary data) from the memory array 100*a* and send the ordinary readout data to the printing apparatus 300 without an encoding operation performed by the semiconductor device 10*a*.

The semiconductor device 10*a* receives the ordinary data readout request and sends ordinary readout data including a 1-bit parity bit added to 8-bit readout data as a received data array shown in FIG. 22 to the printing apparatus 300 (step SS1) without generating encoded data from the data (ordinary data) as the object of the data readout request. The received data array represents a data array received by the printing apparatus 300. The printing apparatus 300 stores the received ordinary readout data into the memory device 302. The data generation module 302*a* of the printing apparatus 300 generates a data array for requiring encoded data readout as a transmitted data array shown in FIG. 23 and sends an encoded data readout request to the semiconductor device 10*a* (PS3). The transmitted data array for requiring encoded data readout shown in FIG. 23 includes three pieces of 1-bit identification information ID, a 5-bit encoding request command, and a 1-bit dummy bit. The encoded data readout request is to read out data, which is identical with the data (ordinary data) read out in response to the ordinary data readout request, from the memory array 100*a*, encode the readout data, and send the encoded readout data to the printing apparatus 300. The semiconductor device 10*a* reads out the same data as the data sent to the printing apparatus 300 in response to the ordinary data readout request, from the memory array 100*a*, performs an encoding operation to generate verification data as a received data array shown in FIG. 23, adds a parity bit to the generated verification data, and sends the resulting data to the printing apparatus 300 (SS2). The received data array shown in FIG. 23 represents data received by the printing apparatus 300 and includes 8-bit verification data and a 1-bit parity bit.

The printing apparatus 300 compares the received verification data with the ordinary readout data stored in the memory device 302. According to a concrete procedure, the printing apparatus 300 makes the ordinary readout data stored in the memory device 302 subjected to the same encoding operation as the encoding operation performed by the semiconductor device 10*a* for generation of the verification data, so as to generate comparative encoded data. In the case of mismatching between the received verification data and the comparative encoded data, it is determined that some abnormality arises in the communication path or that some trouble or failure occurs in the semiconductor device 10*a*.

The data readout process performed by the semiconductor device 10*a* is described below with reference to the flowchart of FIG. 24. This processing routine is triggered when the semiconductor device 10*a* receives a transmitted data array including either an ordinary data readout command or an encoded data readout command (verification data generation command) subsequent to a signal for cancelling the initial state sent from the printing apparatus 300. The semiconductor device 10*a* analyzes identification information ID included in the data array received from the printing apparatus 300 and determines whether the identification information ID included in the received data array is identical with the identification information ID stored in the own memory array 100*a*. Upon determination that the received identification information ID is identical with the identification information ID read from the memory array 100*a*, the semiconductor device 10*a* identifies itself as the access destination of the printing apparatus 300. The semiconductor device 10*a* subsequently identifies whether the received command is either an ordinary data readout command or an encoded data readout command (step S200) and changes over the position of the switch 141*a* in the write-read controller 140*a* corresponding to the identification result of the received command (step S201). The position of the switch 141*a* is changed over to the encoding position SP1 in response to the encoded data readout command as the received command, while being changed over to the ordinary position SP2 in response to the ordinary data readout command as the received command. The semiconductor device 10*a* reads out data (ordinary data) from the memory array 100*a* (step S202) and determines whether an encoding operation is required (step S203). When the received command is identified as the encoded data readout command at step S200 to require an encoding operation (step S203: yes), the semiconductor device 10*a* performs a checksum operation (step S204). The position of the switch 141*a* in the write-read controller 140*a* has been changed over to output the readout data read from the memory array 100*a* to the encoded data generation circuit 150*a*. The encoded data generation circuit 150*a* then performs a checksum operation of the received readout data to compute, for example, an 8-bit checksum value or a 16-bit checksum value. The checksum operation is an irreversible operation that does not give the original data by decoding (first encoding operation). The semiconductor device 10*a* subsequently makes the computed checksum value subjected to a reversible data encoding operation (second encoding operation) to generate verification data (step S205). The second encoding operation utilizes a common key to allow both encoding of data and decoding of encoded data and gives the original data by decoding. The semiconductor device 10*a* activates the parity bit generation addition circuit 160 to perform a parity operation and add an obtained parity value (parity bit) to the generated verification data (encoded data) (step S206) and sends the resulting data to the printing apparatus 30 (step S210). This concludes the data readout process.

When the received command is identified as the ordinary data readout command at step S200 to require no encoding operation (step S203: no), on the other hand, the processing routine proceeds to step S206. The position of the switch 141 in the write-read controller 140*a* has been changed over to output the readout data read from the memory array 100*a* to the parity bit generation addition circuit 160, in place of the encoded data generation circuit 150*a*. The parity bit generation addition circuit 160 performs a parity operation of the readout data read from the memory array 100*a* and adds an obtained parity bit to the ordinary readout data (step S206) and sends the resulting data to the printing apparatus 30 (step S207). This concludes the data readout process. Namely only the parity operation is performed for the ordinary readout data.

The verification process performed by the printing apparatus 300 is described below with reference to the flowchart of FIG. 25. The CPU 301 activates the verification module 302*c* to perform the verification process in the printing apparatus 300. The transmission of the request to the semiconductor device 10*a* (PS1, PS2, PS3 in FIG. 20) is not specifically explained, but the verification process performed after the data reception from the semiconductor device 10*a* (SS1, SS2 in FIG. 20) is mainly described below. In response to the ordinary data readout request (PS2), the printing apparatus 300 receives the ordinary readout data from the semiconductor device 10*a* (step S300, SS1 in FIG. 20). The printing apparatus 300 performs parity check of the received ordinary readout data and removes the parity bit from the ordinary readout data array (step S301). Upon detection of no error as the result of the parity check (step S302: no), goes to step S306. Upon detection of some error as the result of the parity check (step S302: yes), the processing routine proceeds to step S310.

In response to the encoded data readout request (PS3), the printing apparatus 300 receives the encoded readout data (verification data) (step S303, SS2 in FIG. 20) and performs parity check of the received verification data (step S304). Upon detection of no error as the result of the parity check (step S305: no), the printing apparatus 300 removes the parity bit from the encoded readout data array and activates the encoding decoding module 302*b* to decode the encoded readout data and obtain a decoded checksum value CS0 (step S306). Decoding the verification data generated by the reversible encoding operation in the semiconductor device 10*a* gives data corresponding to the checksum value obtained by the checksum operation performed in the semiconductor device 10*a*.

The printing apparatus 300 activates the encoding decoding module 302*b* to perform the same checksum operation as the checksum operation performed in the semiconductor device 10*a* for the ordinary readout data with removal of the parity bit at step S301 and computes a checksum value CS1

(comparative encoded data) (step S307). The printing apparatus 300 then activates the verification module 302*c* to compare the decoded checksum value CS0 with the computed checksum value CS1 (step S308). When the decoded checksum value CS0 is identical with the computed checksum value CS1 (step S309: yes), the processing routine is terminated. The decoded checksum value CS0 identical with the computed checksum value CS1 means that no abnormality arises in the semiconductor device 10*a* and that there is no error in the communication path between the semiconductor device 10*a* and the controller of the printing apparatus 300.

When the decoded checksum value CS0 is different from the computed checksum value CS1 (step S309: no), on the other hand, the printing apparatus 300 notifies the user of a cartridge error (step S310) and terminates this processing routine. Upon detection of some parity error as the result of the parity check (step S302 or step S305: yes), the printing apparatus 300 also notifies the user of a cartridge error (step S310). The notification of the cartridge error may light up or light on and off a preset display lamp provided in the printing apparatus 300 or may show an error message on a display screen provided on the printing apparatus 300. In an application of the printing apparatus 300 connected with a personal computer, an error message may be shown on a display screen of the personal computer.

As described above, the combination of the ink cartridge 20*a* (the semiconductor device 10*a*) with the printing apparatus 300 in the third embodiment compares the ordinary readout data with the encoded readout data (verification data) to effectively detect a communication error or abnormality, which is not detectable based on only either one of the ordinary readout data and the encoded readout data. One prior art procedure does not read out any encoded data but reads out ordinary data twice and detects a communication error or abnormality based on the discrepancy of the two ordinary readout data. Even when some failure arises in the electrical connection between the printing apparatus terminal 320 and the external terminal T of the circuit board CB, the occurrence of no abnormality may be detected in the connection pathway between the printing apparatus 300 and the circuit board CB, based on matching of the first ordinary readout data and the second ordinary readout data. The procedure of this embodiment, on the other hand, performs verification based on both the non-encoded ordinary readout data and the encoded readout data obtained from the same data (ordinary data) read from the memory array 100*a* of the semiconductor device 10*a*. The comparison between the ordinary readout data and the encoded readout data allows more accurate detection of the occurrence of any communication error or any abnormality in the semiconductor device 10*a*.

Upon detection of some abnormality in the communication path or in the semiconductor device 10*a*, a printing operation is not allowed. Such prevention of the printing operation desirably prevents potential troubles caused by erroneous data. One example of the potential trouble caused by the erroneous trouble starts a print job irrespective of the less remaining amount of the liquid in the ink cartridge 20*a* than a required amount of the liquid for completion of the print job and forces to interrupt the print job. Another example of the potential trouble caused by the erroneous trouble starts a printing operation irrespective of the little remaining amount of the liquid in the ink cartridge 20*a* and causes blank hitting to damage a print head.

The procedure of this embodiment performs the checksum operation for data compression and reduces the number of bits used for communication, thus preventing the occurrence of a bit error and improving the communication speed and the subsequent operation speed. The use of the parity bit effectively verifies the reliability of data before and after the communication.

Other Aspects of Third Embodiment (1) The verification process of the third embodiment notifies the user of a cartridge error immediately on detection of some communication error or abnormality based on the discrepancy between the decoded checksum value CS0 and the computed checksum value CS1. One modification may repeat the process of reading out the encoded data and the ordinary data and comparing the decoded checksum value CS0 with the computed checksum value CS1 for verification a preset number of times, for example, two through five times, before notification of the cartridge error.

(2) The procedure of the third embodiment performs the encoded data readout after the ordinary data readout. This sequence is, however, neither essential nor restrictive. The ordinary data readout may be performed after the encoded data readout. The sequence of data readout may be determined arbitrarily as long as the comparison can be made between the ordinary readout data and the encoded readout data.

(3) The semiconductor device 10*a* of the third embodiment includes the memory array of the EEPROM characteristics. The technique of the third embodiment is also applicable to a semiconductor device including a memory array of ferroelectric memory cells and a computing circuit.

(4) The procedure of the third embodiment performs the verification of communication (request and reception of the ordinary readout data or the encoded readout data) after a writing operation of a data array into the semiconductor device 10*a*. The verification of communication may be performed at the time of a first writing operation after activation of the printing apparatus 300, at the time of a first writing operation after replacement of the ink cartridge 20*a*, or after a preset number of writing operations. Even when no data to be written is newly generated, the verification of communication may be performed with specific data stored in the semiconductor device 10*a* after replacement of the ink cartridge 20*a*.

(5) The data readout process of the third embodiment generates and adds a parity bit for both the ordinary readout data and the encoded readout data. Such a parity operation may be omitted for either one or both of the ordinary readout data and the encoded readout data.

The embodiments and their modified examples discussed above are to be considered in all aspects as illustrative for the better understanding of the invention and not restrictive in any sense. The present invention may be embodied in other specific forms with some modifications, changes, and alterations without departing from the scope or spirit of the main characteristics of the present invention. All changes that come within the meaning and range of equivalency of the claims are to be embraced within their scope.

The present application claims priority from the following Japanese Patent applications, the contents of which are hereby incorporated by reference into this application:

(1) Japanese Patent Application No. 2008-79632 (filed on Mar. 26, 2008);

(2) Japanese Patent Application No. 2008-79639 (filed on Mar. 26, 2008); and (3) Japanese Patent Application No. 2009-59583 (filed on Mar. 12, 2009).

What is claimed is:

1. A printing apparatus provided with a liquid container including a semiconductor device configured to store data, the printing apparatus comprising:

an ordinary data readout unit configured to read out non-encoded ordinary data from the semiconductor device;

an encoded data readout unit configured to give a requirement for an encoding operation of the ordinary data to the semiconductor device and read out encoded data obtained by the encoding operation of the ordinary data;

an encoding decoding module configured to make the ordinary data subjected to encoding, which is equivalent to the encoding operation, and thereby generate a comparative encoded data; and a verification unit configured to compare the comparative encoded data with the encoded data and verify a communication status between the semiconductor device and the printing apparatus;

wherein the encoded data is subjected to a reversible second encoding operation subsequent to an irreversible first encoding operation, and the encoding decoding module decodes the second encoding operation of the encoded data to obtain encoded data of only the first encoding operation, while performing the encoding operation of the ordinary data.

2. The printing apparatus in accordance with claim 1, the printing apparatus further having:

a data writing unit configured to write the ordinary data into the semiconductor device, wherein the ordinary data readout unit reads out the ordinary data written by the data writing unit, and the encoded data readout unit reads out the encoded data obtained by the encoding operation of the ordinary data written by the data writing unit.

* * * * *